(12) United States Patent
Kudekar et al.

(10) Patent No.: US 12,114,003 B2
(45) Date of Patent: Oct. 8, 2024

(54) SYSTEM AND METHOD FOR MANAGING ENCODED INFORMATION IN A REAL-TIME SCREEN-TO-CAMERA COMMUNICATION ENVIRONMENT

(71) Applicant: Shrinivas Kudekar, Roswell, GA (US)

(72) Inventors: Shrinivas Kudekar, Roswell, GA (US); Ivan Klimek, Ganovce (SK)

(73) Assignee: Shrinivas Kudekar, Roswell, GA (US)

(*) Notice: Subject to any disclaimer, the term of this patent is extended or adjusted under 35 U.S.C. 154(b) by 36 days.

(21) Appl. No.: 18/321,829

(22) Filed: May 23, 2023

(65) Prior Publication Data
US 2024/0022752 A1    Jan. 18, 2024

Related U.S. Application Data

(60) Provisional application No. 63/368,634, filed on Jul. 15, 2022.

(51) Int. Cl.
| | |
|---|---|
| H04N 19/467 | (2014.01) |
| H04N 9/64 | (2023.01) |
| H04N 19/136 | (2014.01) |
| H04N 19/172 | (2014.01) |
| H04N 19/182 | (2014.01) |
| H04N 19/184 | (2014.01) |
| H04N 19/186 | (2014.01) |
| H04N 19/85 | (2014.01) |
| G06K 19/06 | (2006.01) |
| G06Q 30/0251 | (2023.01) |

(52) U.S. Cl.
CPC ............ *H04N 19/467* (2014.11); *H04N 9/64* (2013.01); *H04N 19/136* (2014.11); *H04N 19/172* (2014.11); *H04N 19/182* (2014.11); *H04N 19/184* (2014.11); *H04N 19/186* (2014.11); *H04N 19/85* (2014.11); *G06K 19/06028* (2013.01); *G06Q 30/0261* (2013.01)

(58) Field of Classification Search
CPC ...... H04N 19/64; H04N 19/85; H04N 19/467; H04N 19/182; G06K 19/06028
See application file for complete search history.

(56) References Cited

U.S. PATENT DOCUMENTS

| | | | |
|---|---|---|---|
| 8,229,159 B2 * | 7/2012 | Tourapis | H04N 19/162 382/100 |
| 10,785,495 B1 * | 9/2020 | Enigma | H04N 19/46 |
| 2023/0109762 A1 * | 4/2023 | Suyama | H04N 19/136 375/240.08 |

* cited by examiner

*Primary Examiner* — Zhubing Ren
(74) *Attorney, Agent, or Firm* — Jason C. Cameron

(57) ABSTRACT

A system and method for managing encoded information in a real-time screen-to-camera communication environment are disclosed. The system converts information into a pre-defined number of characters and generates data symbols in shapes and pilot symbols corresponding to the characters. Further, the system embeds the data symbols in media content frames and modulates pixels and boundaries for display of display device, based on luminance, and adaptively displays frames as temporal-complementary frames. Furthermore, the system detects frames from recorded content, extracts data symbols based on grid and fixed pattern, and detects bit values by analyzing color differences. Additionally, the system generates information based on the detected bit values and outputs the information on an user device display, including products, recommendations, services, and relevant information related to the media content.

24 Claims, 15 Drawing Sheets

SYSTEM AND METHOD FOR MANAGING ENCODED INFORMATION IN A REAL-TIME SCREEN-TO-CAMERA COMMUNICATION ENVIRONMENT

CROSS REFERENCE TO RELATED APPLICATION(S)

This application claims the priority to incorporates by reference the entire disclosure of U.S. provisional patent application No. 63/368,634, filed on Jul. 15, 2022, titled "Method and apparatus for transmitting information via real-world displays without disrupting the viewing experience".

TECHNICAL FIELD

Embodiments of the present disclosure relate to screen-to-camera communication systems and more particularly relate to a system and a method for managing encoded information in a real-time screen-to-camera communication environment.

BACKGROUND

Generally, screens such as monitors, televisions, and digital billboards used for displaying content, whether static or dynamic, have limitations in providing personalized and relevant information to viewers. Video streaming cannot provide interactive and engaging content, e.g., to get more information, buy products and the like, leaving viewers to either pause and search for information or recall it later. Additionally, traditional advertising methods, such as non-skippable ads, are not only irrelevant to viewers but cannot also track customer behavior. This is particularly problematic for digital screens and billboards, which are present in many public places, however, have minimal engagement and impact due to their lack of targeting. With the advent of fifth-generation (5G) mobile networks, video-triggered augmented reality presents an opportunity to enhance customer experience, strengthen customer relationships, and increase conversion rates. However, recent machine learning models make it difficult to differentiate between fake and genuine websites and sources of information, creating cybersecurity concerns. Traditional quick response (QR) codes could potentially address some of the aforementioned challenges, however, an aesthetic appearance of the QR codes can be disruptive to the user experience and interfere with the overall visual appeal of a product.

Conventionally, a method provides a digital watermarking method by embedding information in the transform domain or using classical steganography. Classical steganography is used to hide information in images while changing the original content as little as possible. Transform domain techniques embed information in mid to high frequencies, because most of the content lies in low frequency for natural images. However, these techniques are not well-suited for screen-to-camera communication because the channel is inherently noisy, and images are of poor quality, especially in low ambient lighting. There is also perspective distortion and motion blur due to the misalignment of the hand-held device acting as the receiver with the screen. Additionally, the screen-camera channel adds high-frequency noise such as Moire patterns, and frame splitting can occur, leading to burst erasures. Classical steganography and modern deep neural network-based approaches embed information in high frequencies. However, the screen-camera channel has more low-pass filtering effects that can destroy any information transmitted in high frequencies. Sending information at low frequencies can also tamper with the original image or video. These factors make embedding information in the transform domain as specified by classical steganography unsuitable for screen-camera communication.

Additionally, another conventional method provides screen-camera communication using techniques arising in radio frequency (RF) communications, such as optical orthogonal frequency-division multiplexing (OFDM). The OFDM technique involves transmitting information using 2D OFDM symbols to transmit information using spatial frequencies. These techniques are well-suited to combat inter-symbol interference (ISI) by transmitting in the frequency domain. However, the channel is highly nonlinear and requires nonlinear equalization techniques, making them non-trivial to implement. Yet another conventional method provides embedding information method by using deep neural networks that can hide and recover information in images and videos. However, using deep neural networks it is challenging to model the screen-camera channel accurately. Inaccuracies can occur when deploying them in the wild. Additionally, the networks are trained on specific datasets, making them unsuitable for screen-camera communication in real-world scenario. Further, another conventional method provides transmitting information in a spatiotemporal domain using unobtrusive screen-camera communication. Further, another conventional method provides invisible on-screen barcode with image-based extraction. The conventional method includes converting the screen barcode to a different color space other than RGB, using orthogonal symbols for transmission and the like. Yet another conventional method provides a video-watermarking scheme to develop a reference service for video. However, the conventional methods and systems may not exact color space to convert to an orthogonal space or a perceptual color space so that changing any one does not affect the other. Further, the conventional methods and systems may not flicker region of interest or shape of the symbols and the like. The conventional method has relied on modulating the intensity of light or luminance, but this creates flicker at 60 Hz (low) refresh rates and requires precise screen detection. Other issues with using intensity modulation include the need for precise screen detection and the fact that the red, green, and blue (RGB) color space is not orthogonal. One alternative approach is to use opponent colors for transmission, but this also has limitations and requires complex equalization to recover the data.

Further, traditional advertising methods have proven to be less effective in recent years due to the frustration it causes viewers and the low return on investment for advertisers. Advertisements that interrupt content, such as television commercials, are often skipped or ignored, resulting in a low ROI on advertising spend. Overlay and banner advertisements, while less obtrusive, can still be seen as distracting and annoying to viewers. Product placement, which involves incorporating a brand's product into the content, has been used as an alternative to traditional advertisements, but it limits the actionability of the ad and may not be effective for all types of products. Co-viewing also presents a challenge for personalized advertising. When multiple people are watching the same content, it can be difficult to personalize ads for each viewer. As a result, advertisers may resort to generic ads that are less effective in terms of engagement and return on investment (ROI). While some services provide additional information about the content through X-Ray-like features, these can be obtrusive and take away from the viewing experience due to overlay of information on the screen. Simultaneous browsing for information through a separate device or delayed search can be distracting and ineffective in providing a seamless user experience.

Hence, there is a need in the art, to address at least the aforementioned issues, for an effective system and a method for managing encoded information in a real-time screen-to-camera communication environment, that prioritizes security and visual appeal without disrupting the viewing experience by utilizing an unobtrusive technique, have higher actionability, and be able to personalize advertisements for individual viewers regardless of co-viewing situations.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

An aspect of the present disclosure provides a computer-implemented system for managing encoded information in a real-time screen-to-camera communication environment. The system converts information into a pre-defined number of characters. Further, the system generates at least one of one or more data symbols, one or more pilot symbols, and one or more scannable barcodes corresponding to the pre-defined number of characters. One or more data symbols are generated in one or more shapes. Furthermore, the system embeds, for a pre-defined duration of media content, the generated at least one of the one or more data symbols the one or more pilot symbols, and the one or more scannable barcodes in each of one or more frames of the media content. One or more data symbols are embedded as at least one of a grid and a fixed pattern on each of the one or more frames, and the one or more pilot symbols are embedded as a column of at least one of discrete pilot symbols and a single continuous column of a color on each of the one or more frames. Additionally, the system adaptively modulates, over at least one of a color channel and a luminance channel, one or more pixels and a boundary in each of the one or more frames for the pre-defined duration, for the embedded one or more data symbols and the one or more pilot symbols. Further, the system adaptively displays, each pixel, on a screen associated with a display device, at least one of the scannable barcodes and the modulated one or more pixels, and the boundary in each of the one or more frames for the pre-defined duration, based on a luminance of each of one or more regions in each of one or more frames. The one or more frames are adaptively displayed as one or more temporal-complementary frames (TCF).

Further, the system receives recorded content corresponding to the media content, recorded through a camera associated with an user device. Furthermore, the system detects the one or more frames from the recorded content, wherein the detected one or more frames are converted into a color space. The system detects at least one of the one or more data symbols, the one or more pilot symbols, and the one or more scannable barcodes in the detected the one or more frames. Additionally, the system extracts the one or more data symbols from the one or more frames based on at least one of the grid and the fixed pattern. The one or more data symbols are extracted based on a position of the column of the one or more pilot symbols in each of the one or more frames. Further, the system detects one or more bit values of each data symbol, by analyzing a color difference between each of the one or more frames and a shape of the one or more data symbols. The color difference of the one or more data symbols and the pilot symbols is cumulatively accumulated over the one or more frames for energy accumulation to analyze the color difference between each of the one or more frames and the one or more shapes of the one or more data symbols.

Furthermore, the system generates the information based on at least one of the detected bit values of the one or more frames and the detected one or more scannable barcodes. Additionally, the system outputs the generated information through at least one of displaying on a display of the user device and transmitting the information to one or more digital delivery destination platforms. Outputting the generated information comprises displaying at least one of one or more products, one or more recommendations, one or more services, and relevant information regarding the media content to a user of the user device for interacting with the information in a unobtrusive mode.

Another aspect of the present disclosure provides a computer-implemented method for managing encoded information in a real-time screen-to-camera communication environment. The method includes converting information into a pre-defined number of characters. Further, the method includes generating at least one of one or more data symbols and one or more pilot symbols, and one or more scannable barcodes corresponding to the pre-defined number of characters. The one or more data symbols are generated in one or more shapes. Furthermore, the method includes embedding, for a pre-defined duration of media content, the generated at least one of the one or more data symbols the one or more pilot symbols, and the one or more scannable barcodes in each of one or more frames of the media content. The one or more data symbols are embedded as at least one of a grid and a fixed pattern on each of the one or more frames, and the one or more pilot symbols are embedded as a column of at least one of discrete pilot symbols and a single continuous column of a color on each of the one or more frames. Additionally, the method includes adaptively modulating over at least one of a color channel and a luminance channel, one or more pixels, and a boundary in each of the one or more frames for the pre-defined duration for the embedded one or more data symbols and the one or more pilot symbols. Further, the method includes adaptively displaying, each pixel, on a screen associated with a display device, at least one of the scannable barcodes and the modulated one or more pixels, and the boundary in each of the one or more frames for the pre-defined duration, based on a luminance of each of one or more regions in each of one or more frames. The one or more frames are adaptively displayed as one or more temporal-complementary frames (TCF).

Furthermore, the method includes receiving recorded content corresponding to the media content, recorded through a camera associated with an user device. Further, the method includes detecting the one or more frames from the recorded content. The detected one or more frames are converted into a color space. Further, the method includes detecting at least one of the one or more data symbols, the one or more pilot symbols, and the one or more scannable barcodes in the detected the one or more frames. Furthermore, the method includes extracting the one or more data symbols from the one or more frames based on at least one of the grid and the fixed pattern. The one or more data symbols are extracted based on a position of the column of the one or more pilot symbols in each of the one or more frames. Further, the method includes detecting one or more bit values of each data symbol, by analyzing a color difference between each of the one or more frames and a shape of the one or more data symbols. The color difference of the one or more data symbols and the one or more pilot symbols is cumulatively accumulated over the one or more frames for an energy accumulation to analyze the color difference between each of the one or more frames and the one or more shapes of the one or more data symbols. Additionally, the method includes generating the information based on at least one of the detected bit values of the one or more frames and the detected one or more scannable barcodes. Further, the method includes outputting the generated information through at least one of displaying on a display of the user device and transmitting the information to one or more digital delivery destination platforms. Outputting the generated information comprises displaying at least one of one or more products, one or more recommendations, one or more services, and relevant information regarding the media content to a user of the user device for interacting with the information in a unobtrusive mode.

Yet another aspect of the present disclosure provides a non-transitory computer-readable storage medium having instructions stored therein. That, when executed by one or more hardware processors, causes the one or more hardware processors to generate at least one of one or more data symbols and one or more pilot symbols, and one or more scannable barcodes corresponding to the pre-defined number of characters. The one or more data symbols are generated in one or more shapes. Furthermore, the one or more hardware processors embed, for a pre-defined duration of media content, the generated at least one of the one or more data symbols the one or more pilot symbols, and the one or more scannable barcodes in each of one or more frames of the media content. The one or more data symbols are embedded as at least one of a grid and a fixed pattern on each of the one or more frames, and the one or more pilot symbols are embedded as a column of at least one of discrete pilot symbols and a single continuous column of a color on each of the one or more frames. Additionally, the one or more hardware processors adaptively modulate, over at least one of a color channel and a luminance channel, one or more pixels and a boundary in each of the one or more frames for the pre-defined duration, for the embedded one or more data symbols and the one or more pilot symbols. Further, the one or more hardware processors adaptively display, each pixel, on a screen associated with a display device, at least one of the scannable barcodes and the modulated one or more pixels, and the boundary in each of the one or more frames for the pre-defined duration, based on a luminance of each of one or more regions in each of one or more frames. The one or more frames are adaptively displayed as one or more temporal-complementary frames (TCF).

Further, the one or more hardware processors receive recorded content corresponding to the media content, recorded through a camera associated with an user device. Furthermore, the one or more hardware processors detect the one or more frames from the recorded content. The detected one or more frames are converted into a color space. Further, the one or more hardware processors detect at least one of the one or more data symbols, the one or more pilot symbols, and the one or more scannable barcodes in the detected the one or more frames. Additionally, the one or more hardware processors extract the one or more data symbols from the one or more frames based on at least one of the grid, and the fixed pattern. The one or more data symbols are extracted based on a position of the column of the one or more pilot symbols in each of the one or more frames. Further, the one or more hardware processors detect one or more bit values of each data symbol, by analyzing a color difference between each of the one or more frames and a shape of the one or more data symbols. The color difference of the one or more data symbols and the one or more pilot symbols is cumulatively accumulated over the one or more frames for an energy accumulation to analyze the color difference between each of the one or more frames and the one or more shapes of the one or more data symbols. Furthermore, the one or more hardware processors generate the information based on at least one of the detected bit values of the one or more frames and the detected one or more scannable barcodes. Additionally, the one or more hardware processors output the generated information through at least one of displaying on a display of the user device and transmitting the information to one or more digital delivery destination platforms. Outputting the generated information comprises displaying at least one of one or more products, one or more recommendations, one or more services, and relevant information regarding the media content to a user of the user device for interacting with the information in a unobtrusive mode.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF ACCOMPANYING DRAWINGS

The disclosure will be described and explained with additional specificity and detail with the accompanying figures in which.

Figure 6:
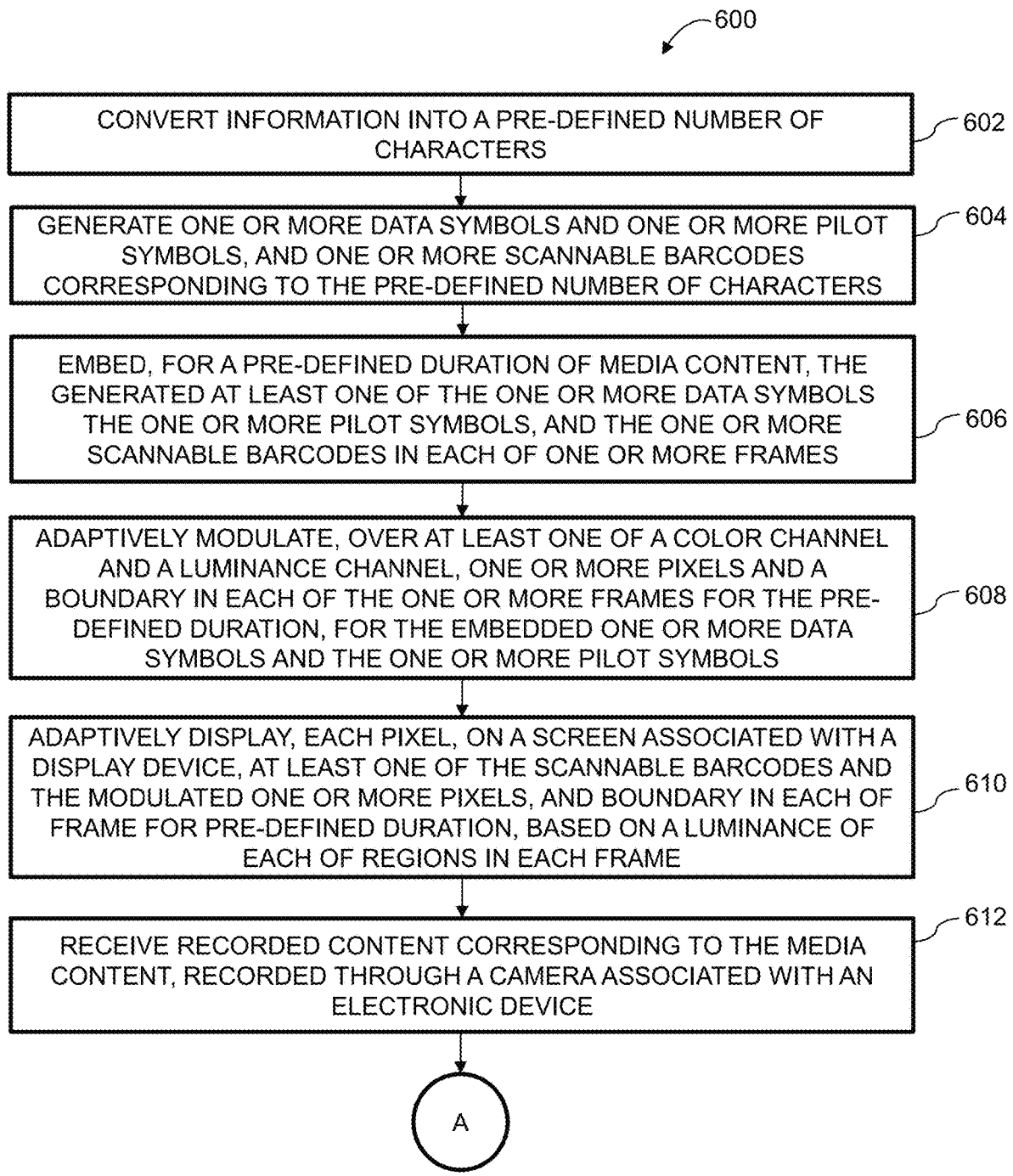
Figure 6:
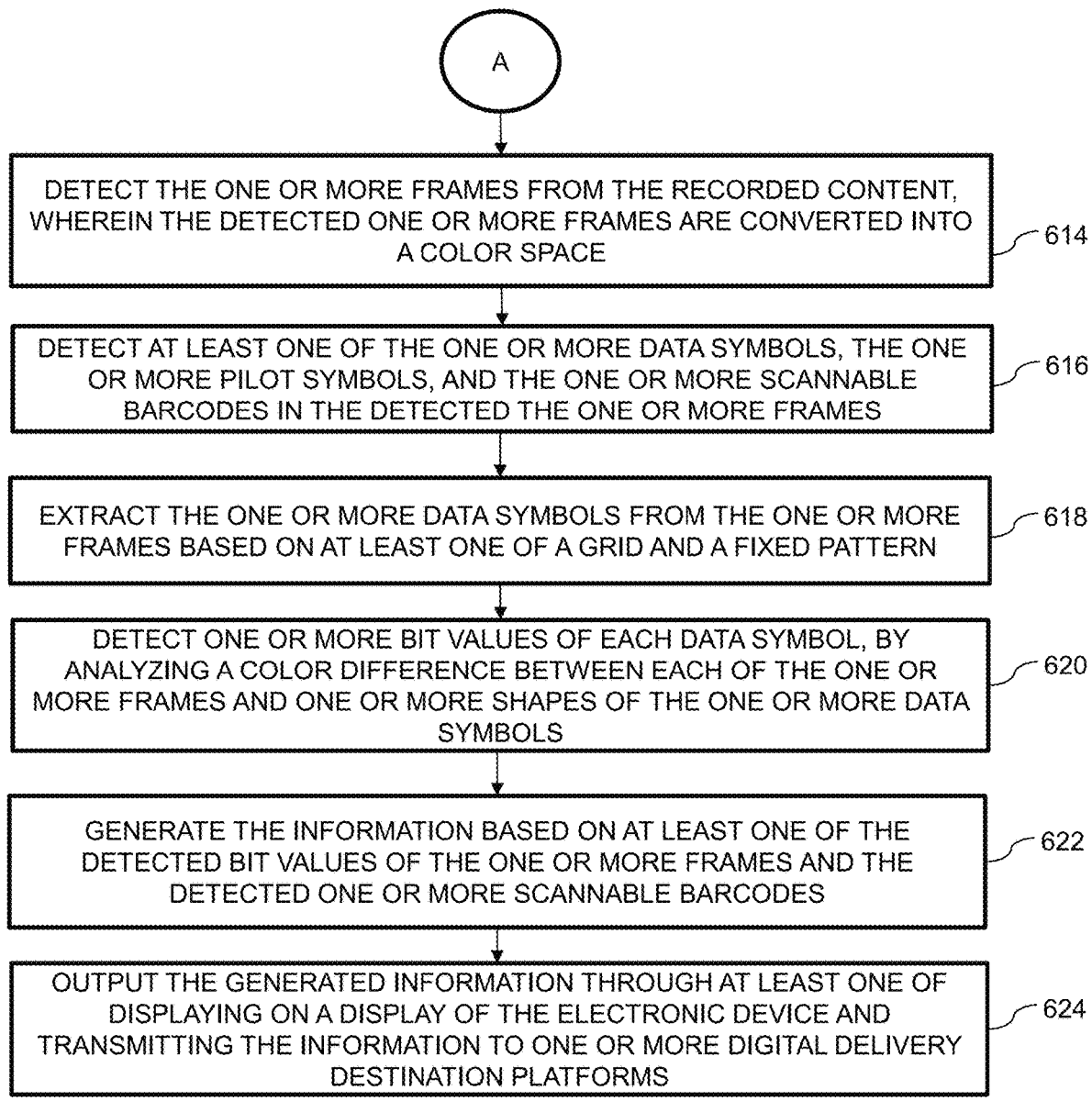
Figure 7:
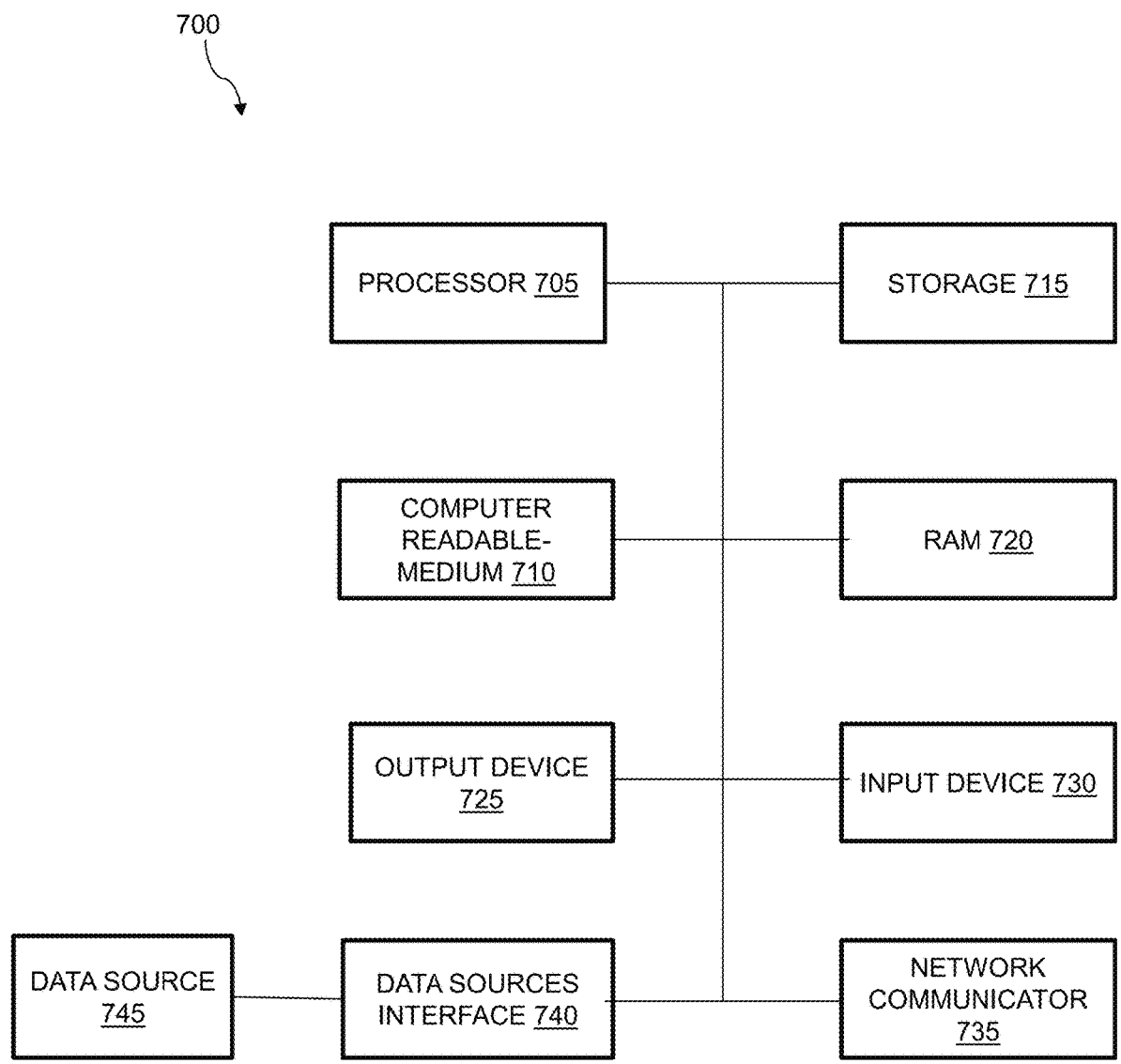

FIG. 6 illustrates a flow chart depicting a method for managing encoded information in a real-time screen-to-camera communication environment, according to an example embodiment of the present disclosure; and FIG. 7 illustrates an exemplary block diagram representation of a hardware platform for an implementation of the disclosed system, according to an example embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional submodules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client, or server computer system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or a "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired), or temporarily configured (programmed) to operate in a certain manner and/or to perform certain operations described herein.

Embodiments of the present disclosure provide a system and a method for managing encoded information in a real-time screen-to-camera communication environment. The present disclosure embeds information in real-world displays, such as monitors, television screens, digital billboards, and other display screens, and recovering the information using a hand-held user device such as a smartphone, tablet, or any other hand-held device.

The present disclosure provides a system and a method for operating a communication channel between the screen and camera with a low signal-to-noise (SNR) ratio. Further, the present disclosure addresses various issues such as perspective distortion, frame splitting, burst erasures, motion blur, and the like, in the real-time screen-to-camera communication environment. The present disclosure focuses on detecting the frame instead of the screen in screen-to-camera communication. The present disclosure requires low complexity encoding and decoding methods. Additionally, the present disclosure allows for larger modulation depths to decode data while remaining unobtrusive to human vision. Further, the present disclosure provides a system and a method for transmitting data at low rates with a low SNR ratio, thereby ensuring unobtrusive screen-to-camera communication. Also, the present disclosure provides a system and a method for transmitting high data rates, e.g., by transmitting symbols of higher degree such as alphanumerical characters (data symbols) or embedding an invisible scannable barcode (e.g., quick response (QR) codes) capable of carrying large number of information bits. The present disclosure provides a system and a method for embedding and transmitting the information within media content of a specific duration, for example, seven seconds. The present disclosure overcomes the technical challenge by significantly achieving imperceptible transmission on, for example, 60 Hz monitors to display information unobtrusively to the human vision.

The present disclosure enables personalized, relevant, and engaging promotions to be displayed to users of digital screens or billboards in public places such as malls, airports, sports arenas, city centers, and other high-traffic locations. Additionally, the present disclosure provides a system and a method for verifying the authenticity of websites and sources of information, defeating deep fakes, and ensuring cybersecurity in the real-time screen-to-camera communication environment. The present disclosure leverages the low-latency and high-bandwidth capabilities of new radio and/or fifth-generation (5G) mobile network technology to enhance the customer experience, deepen customer relationships, and increase conversion rates.

Referring now to the drawings, and more particularly to FIG. 1 through FIG. 7, where similar reference characters denote corresponding features consistently throughout the figures, there are shown preferred embodiments and these embodiments are described in the context of the following exemplary system and/or method.

Figure 1:
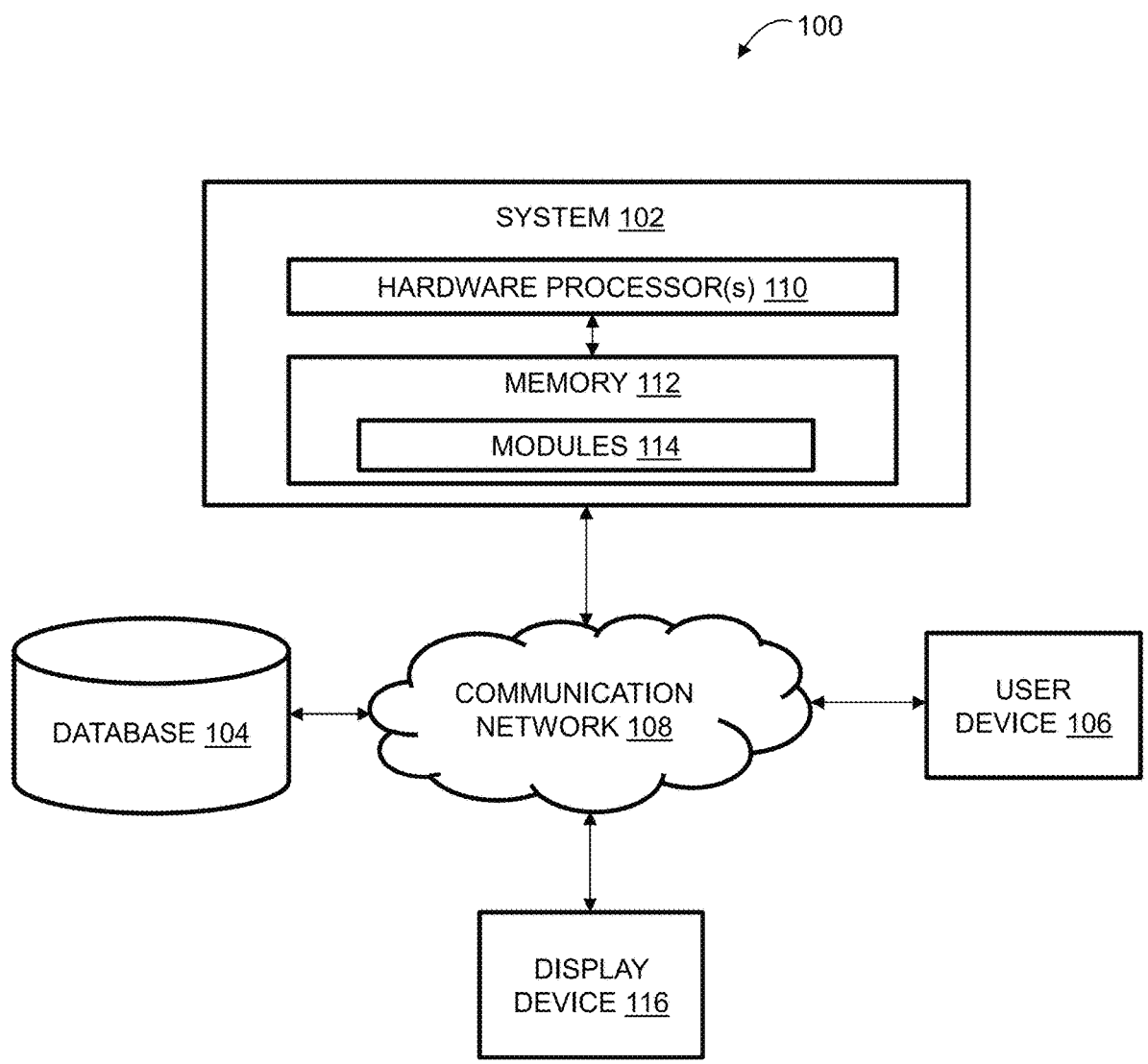
FIG. 1 illustrates an exemplary block diagram representation of a network architecture implementing a system for managing encoded information in a real-time screen-to-camera communication environment, in accordance with an embodiment of the present disclosure.

FIG. 1 illustrates an exemplary block diagram representation of a network architecture 100 implementing a system 102 for managing encoded information in a real-time screen-to-camera communication environment, in accordance with an embodiment of the present disclosure. According to FIG. 1, the network architecture 100 may include the system 102, a database 104, a user device 106, and a display device 116. The system 102 may be communicatively coupled to the database 104, and the user device 106 via a communication network 108. The communication network 108 may be a wired communication network and/or a wireless communication network. The database 104 may include, but is not limited to, media content, media information, product catalogs, product information, offers information, promotional information, any other content, and combinations thereof.

Further, the user device 106 and the display device 116 may be associated with, but not limited to, a user, a viewer, an individual, an administrator, a vendor, a technician, a worker, a supervisor, a team, an entity, an organization, a facility, and the like. The entity and the facility may include, but is not limited to, a hospital, an e-commerce company, a merchant organization, an airline company, a hotel booking company, a company, an outlet, a manufacturing unit, an enterprise, an organization, an educational institution, a secured facility, a warehouse facility, a supply chain facility, any other facility, and the like.

The user device 106 may be used to provide input and/or receive output to/from the system 102. The user device 106 may present to the user one or more user interfaces for the user to interact with the system 102 for the encoded information managing needs. The user device 106 may be at least one of, an electrical, an electronic, an electromechanical, and a computing device. The user device 106 may include, but is not limited to, a mobile device, a smartphone, a Personal Digital Assistant (PDA), a tablet computer, a phablet computer, a wearable computing device, a Virtual Reality/Augmented Reality (VR/AR) device, a laptop, a desktop, a server, and the like. Further, the display device 116 may include, but is not limited to, a monitor, a television, a projector, a digital billboard, a digital signage, a smartphone, a tablet, a phablet, any other display device, and the like.

Further, the system 102 may be implemented by way of a single device or a combination of multiple devices that may be operatively connected or networked together. The system 102 may be implemented in hardware or a suitable combination of hardware and software. The system 102 includes a hardware processor(s) 110 and a memory 112. The memory 112 may include a plurality of modules 114. The system 102 may be a hardware device including the hardware processor 110 executing machine-readable program instructions for managing encoded information in a real-time screen-to-camera communication environment. Execution of the machine-readable program instructions by the hardware processor 110 may enable the proposed system 102 to manage encoded information in a real-time screen-to-camera communication environment. The "hardware" may comprise a combination of discrete components, an integrated circuit, an application-specific integrated circuit, a field-programmable gate array, a digital signal processor, or other suitable hardware. The "software" may comprise one or more objects, agents, threads, lines of code, subroutines, separate software applications, two or more lines of code, or other suitable software structures operating in one or more software applications or on one or more processors.

The hardware processor 110 may include, for example, microprocessors, microcomputers, microcontrollers, digital signal processors, central processing units, state machines, logic circuits, and/or any devices that manipulate data or signals based on operational instructions. Among other capabilities, the hardware processor 110 may fetch and execute computer-readable instructions in the memory 112 operationally coupled with the system 102 for performing tasks such as data processing, input/output processing, and/or any other functions. Any reference to a task in the present disclosure may refer to an operation being or that may be performed on data.

Although FIG. 1 illustrates the system 102, the user device 106, and the display device 116 connected to the database 104, one skilled in the art can envision that the system 102, the user device 106, and the display device 116 connected to the database 104 can be connected to several user devices, display devices located at different locations and several databases via the communication network 108.

Those of ordinary skilled in the art will appreciate that the hardware depicted in FIG. 1 may vary for particular implementations. For example, other peripheral devices such as an optical disk drive and the like, a local area network (LAN), a wide area network (WAN), a wireless (e.g., wireless-fidelity (Wi-Fi)) adapter, a graphics adapter, a disk controller, an input/output (I/O) adapter also may be used in addition or place of the hardware depicted. The depicted example is provided for explanation only and is not meant to imply architectural limitations concerning the present disclosure.

Those skilled in the art will recognize that, for simplicity and clarity, the full structure and operation of all data processing systems suitable for use with the present disclosure are not being depicted or described herein. Instead, only so much of the system 102 as is unique to the present disclosure or necessary for an understanding of the present disclosure is depicted and described. The remainder of the construction and operation of the system 102 may conform to any of the various current implementations and practices that were known in the art.

In an exemplary embodiment, the system 102 may be configured to convert information into a pre-defined number of characters. For example, the information comprising at least one of one or more products, one or more recommendations, one or more services, and relevant information regarding the media content may include, but is not limited to, a website link, a product catalog, product information, offer information, promotional information, media information, trivia information related to the media content, any other information, and the like. For example, the system 102 may provide the viewer of the display device, when the user points the smart phone to the screen, with a website which allows the user to explore the particular scene the user is watching. The website may include suggestions such as 'look more information on the products on the screen' or 'look up trivia' or 'post that scene on their social media to start a conversation' or 'even look up conversation related to that scene on social media'. The viewer can pick and choose what the user would like to know more about the media content. The media content may include, but is not limited to, a video, an internet video, a streaming platform video, a movie, an advertisement, a social media video, a motion picture video, a sci-fi video, and the like.

In an exemplary embodiment, the system 102 may be configured to generate at least one of one or more data symbols and one or more pilot symbols, and one or more scannable barcodes corresponding to the pre-defined number of characters. For example, the one or more scannable barcodes may be for example, quick response (QR) code, which is embedded (made invisible) by chromatic flickering. There may be no need for detecting frame because the QR code (after energy accumulation) may have the in-built ability to correct perspective distortion and the like. In an example, the embedded information may not be restricted to the one or more data symbols (which take shape from a pre-defined set of shapes), however, the embedded information may also be an actual QR code. The system 102 uses off-the-shelf QR codes, by chromatic flickering in the OKLAB color space, to make the QR code invisible. Moreover, the QR code may occupy an entire screen of the display device 116. Also, in case of using the QR codes, the system 102 need not modulate the boundary to detect the frame. The QR code has inherent capabilities that enable it to perform the same functions as frame detection.

The one or more data symbols are generated in one or more shapes. One or more data symbols are modulated by modifying each pixel value within a shape of the one or more data symbols using at least one of a fixed modulation depth, a pyramid technique and a rim technique, and the like. The pyramidU technique comprises varied modulation depth based on the region of each of the one or more frames. The rim technique comprises modulating a few pixels along the boundary of the shape of the one or more data symbols and inside of the shape is not modulated. For example, consider a circle as a shape, by using the rim technique, the pixels are modulated along a small annulus at the boundary of the shape. This is useful because flickering effects reduce with the number of modulates or fluctuated pixels. Further, to decode the shape of the symbol (to get the corresponding information bits associated to it) the boundary may be modulated. The inside of the shape provides information of the boundary.

The column of the one or more pilot symbols is positioned on the one or more frames in at least one of a left, a right, and a middle of each of the one or more frames based on the content of the frame, with the position fixed for the pre-defined duration of the media content.

In an exemplary embodiment, the system 102 may be configured to embed, for a pre-defined duration of media content, the generated at least one of the one or more data symbols the one or more pilot symbols, and the one or more scannable barcodes in each of one or more frames of the media content. Before embedding the one or more data symbols, the system 102 may be configured to perform at least one of an up-sample and an interpolate the media content with a frame rate lower than a pre-defined frame rate to a higher frame rate of the pre-defined frame rate using, but not limited to, an optical flow based techniques, a sample-and-hold interpolation technique, a linear interpolation technique, an optical flow interpolation technique, a deep neural network-based interpolation technique, and the like. The one or more data symbols are embedded as at least one of a grid and a fixed pattern on each of the one or more frames, and the one or more pilot symbols are embedded as a column of at least one of discrete pilot symbols and a single continuous column of a color on each of the one or more frames.

In an exemplary embodiment, the system 102 may be configured to adaptively modulate, over, but not limited to, a color channel and a luminance channel, a lightness channel, an intensity channel one or more pixels, a boundary, and the like, in each of the one or more frames for the pre-defined duration, for the embedded one or more data symbols and the one or more pilot symbols. Each of the one or more frames may be adaptively modulated by converting a standard color space to at least one of an orthogonal color space and a perceptual color space. The standard color space comprise a red green blue (RGB) color space, and wherein the orthogonal color space comprises an OKlab color space, and the like. The luminance channel, the lightness channel, the intensity channel are orthogonal to the color channel, so that the changing value on one channel does not affect the other channel.

In an exemplary embodiment, the system 102 may be configured to adaptively display, each pixel, on a screen associated with the display device 116, at least one of the scannable barcodes and the modulated one or more pixels, and the boundary in each of the one or more frames for the pre-defined duration, based on a luminance of each of one or more regions in each of one or more frames. The one or more frames are adaptively displayed as one or more temporal-complementary frames (TCF).

In an exemplary embodiment, the system 102 may be configured to receive recorded content corresponding to the media content, recorded through a camera associated with the user device 106. In an exemplary embodiment, the system 102 may be configured to detect the one or more frames from the recorded content. The detected one or more frames are converted into a color space. In an exemplary embodiment, the system 102 may be configured to detect at least one of the one or more data symbols, the one or more pilot symbols, and the one or more scannable barcodes in the detected the one or more frames.

In an exemplary embodiment, the system 102 may be configured to extract the one or more data symbols from the one or more frames based on at least one of the grid and the fixed pattern. The grid and the fixed pattern may be a regular grid or any other fixed pattern. The one or more data symbols are extracted based on a position of the column of the one or more pilot symbols in each of the one or more frames.

In an exemplary embodiment, the system 102 may be configured to detect one or more bit values of each data symbol, by analyzing a color difference between each of the one or more frames and a shape of the one or more data symbols. The color difference of the one or more data symbols and the one or more pilot symbols is cumulatively accumulated over the one or more frames for an energy accumulation to analyze the color difference between each of the one or more frames and the one or more shapes of the one or more data symbols.

In an exemplary embodiment, the system 102 may be configured to generate the information based on at least one of the detected bit values of the one or more frames and the detected one or more scannable barcodes. In an exemplary embodiment, the system 102 may be configured to output the generated information through at least one of displaying on a display of the user device 106 and transmitting the information to one or more digital delivery destination platforms. Outputting the generated information comprises displaying, but is not limited to, one or more products, one or more recommendations, one or more services, and relevant information regarding the media content to a user of the user device 106 for interacting with the information in a unobtrusive mode. Further, the one or more digital delivery destination platforms may include, but not limited to, an email, a social media, a messaging application, an instant messaging application, a short message service (SMS), communication applications, and any other digital delivery platforms, or combination thereof.

Figure 2:
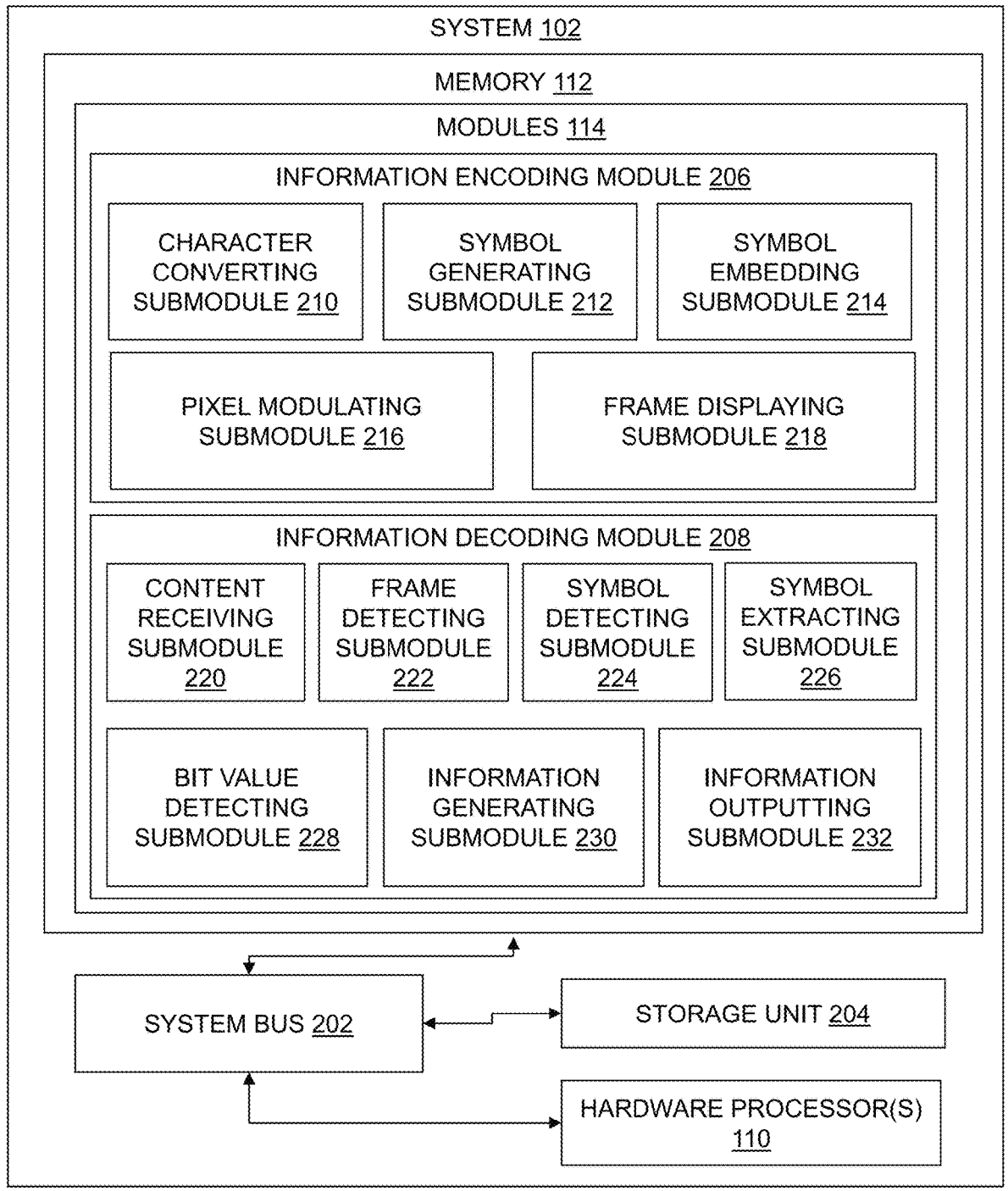
FIG. 2 illustrates an exemplary block diagram representation of a computer-implemented system, such as those shown in FIG. 1, capable of managing encoded information in a real-time screen-to-camera communication environment, in accordance with an embodiment of the present disclosure.

FIG. 2 illustrates an exemplary block diagram representation of a computer-implemented system, such as those shown in FIG. 1, capable of managing encoded information in a real-time screen-to-camera communication environment, in accordance with an embodiment of the present disclosure. The system 102 comprises the one or more hardware processors 110, the memory 112, and a storage unit 204. The one or more hardware processors 110, the memory 112, and the storage unit 204 are communicatively coupled through a system bus 202 or any similar mechanism. The memory 112 comprises a plurality of modules 114 and submodules in the form of programmable instructions executable by the one or more hardware processors 110.

Further, the plurality of modules 114 includes an information encoding module 206, and an information decoding 208. The information encoding module 206, and the information decoding module 208 include a plurality of submodules. The information encoding module 206 includes the plurality of submodules such as a character converting submodule 210, a symbol generating submodule 212, a symbol embedding submodule 214, a pixel modulating submodule 216, and a frame displaying submodule 218. Further, the information decoding module 208 includes the plurality of submodules such as, a content receiving submodule 220, a frame detecting submodule 222, a symbol detecting submodule 224, a symbol extracting submodule 226, a bit value detecting submodule 228, an information generating submodule 230, and an information outputting submodule 232.

The one or more hardware processors 110, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 110 may also include embedded controllers, such as generic or programmable logic devices or arrays, application-specific integrated circuits, single-chip computers, and the like.

The memory 112 may be a non-transitory volatile memory and a non-volatile memory. The memory 112 may be coupled to communicate with the one or more hardware processors 110, such as being a computer-readable storage medium. The one or more hardware processors 110 may execute machine-readable instructions and/or source code stored in the memory 112. A variety of machine-readable instructions may be stored in and accessed from the memory 112. The memory 112 may include any suitable elements for storing data and machine-readable instructions, such as read-only memory, random access memory, erasable programmable read-only memory, electrically erasable programmable read-only memory, a hard drive, a removable media drive for handling compact disks, digital video disks, diskettes, magnetic tape cartridges, memory cards, and the like. In the present embodiment, the memory 112 includes the plurality of modules 114 stored in the form of machine-readable instructions on any of the above-mentioned storage media and may be in communication with and executed by the one or more hardware processors 110.

The storage unit 204 may be a cloud storage or a database. The storage unit 204 may store media content, media information, product catalogs, product information, offers information, promotional information, any other content, and combinations thereof.

In an exemplary embodiment, the information encoding module 206 may execute the character converting submodule 210 to convert information into a pre-defined number of characters. For example, the information may include, but is not limited to, a website link, a product catalog, product information, offer information, promotional information, media information, trivia information related to the media content, any other information, and the like.

In an exemplary embodiment, the information encoding module 206 may execute the symbol generating submodule 212 to generate at least one of one or more data symbols and one or more pilot symbols, and one or more scannable barcodes corresponding to the pre-defined number of characters. The one or more data symbols are generated in one or more shapes. One or more data symbols are modulated by modifying each pixel value within one or more shapes of the one or more data symbols using at least one of a fixed modulation depth, a pyramidU technique, a rim technique, and the like. The pyramidU technique comprises varied modulation depth based on the region of each of the one or more frames. The rim technique comprises modulating along the boundary of the one or more data symbols. The column of the one or more pilot symbols is positioned on the one or more frames in at least one of a left, a right, and a middle of each of the one or more frames based on the content of the frame, with the position fixed for the pre-defined duration of the media content. The rim technique comprises modulating along the boundary of the one or more data symbols.

In an exemplary embodiment, the information encoding module 206 may execute the symbol embedding submodule 214 to embed, for a pre-defined duration of media content, the generated at least one of the one or more data symbols the one or more pilot symbols, and the one or more scannable barcodes in each of one or more frames of the media content. Before embedding the one or more data symbols, the symbol embedding submodule 214 may be configured to perform at least one of an up-sample and an interpolate the media content with a frame rate lower than a pre-defined frame rate to a higher frame rate of the pre-defined frame rate using, but not limited to, an optical flow based techniques, a sample-and-hold interpolation technique, a linear interpolation technique, an optical flow interpolation technique, a deep neural network-based interpolation technique, and the like. The one or more data symbols are embedded as a grid and/or a fixed pattern on a pre-defined region on each of the one or more frames. The one or more pilot symbols are embedded as a column of at least one of discrete pilot symbols and a single continuous column of a color on each of the one or more frames. For example, the information may be embedded in a specific region of the frame. If there is a dress appearing on a large portion of the screen, the information may be embedded either on a grid or otherwise in the region defined by the dress.

In an exemplary embodiment, the information encoding module 206 may execute the pixel modulating submodule 216 to adaptively modulate, over, but not limited to, a color channel and a luminance channel, a lightness channel, an intensity channel, one or more pixels, a boundary, and the like, in each of the one or more frames for the pre-defined duration, for the embedded one or more data symbols and the one or more pilot symbols. Each of the one or more frames may be adaptively modulated by converting a standard color space to at least one of an orthogonal color space and a perceptual color space. The standard color space comprises a red, green, blue (RGB) color space. The orthogonal color space comprises an OKlab color space, and the like. The luminance channel, the lightness channel, the intensity channel are orthogonal to the color channel, so that the changing value on one channel does not affect the other channel.

In an exemplary embodiment, the information encoding module 206 may execute the frame displaying submodule 218 to adaptively display, each pixel, on a screen associated with the display device 116, at least one of the scannable barcodes and the modulated one or more pixels, and the boundary in each of the one or more frames for the pre-defined duration, based on a luminance of each of one or more regions in each of one or more frames. The one or more frames are adaptively displayed as one or more temporal-complementary frames (TCF). The frame displaying submodule 218 may be further configured to apply opponent colors, for one bit of the information, for each of the one or more data symbols for each of the subsequent frames in the one or more frames. The frame displaying submodule 218 may be configured to display an indicia on the screen of the display device, upon adaptively displaying at least one of the scannable barcodes and the modulated one or more pixels, and the boundary in each of the one or more frames for the pre-defined duration. For example, the indicia may nudge the viewers to pick up their smart phones and point to the screen of the display device. The indicia indicate viewers of the display device that more information regarding the current scene/advertisement/video may be available.

For adaptively displaying, each pixel, on the screen associated with the display device 116, for the modulated one or more pixels, and the boundary in each of the one or more frames, the information encoding module 206 further comprises a luminance determining submodule (not shown in FIGS.). The luminance determining submodule configured to determine a luminance value of each of the adaptively modulated one or more pixels. Further, the information encoding module 206 comprises a luminance modulating submodule (not shown in FIGS.) configured to modulate the luminance value, over the luminance channel, of the one or more pixels, when the determined luminance value of each of the adaptively modulated one or more pixels is lesser than a first pre-defined threshold. Furthermore, the luminance modulating submodule is configured to modulate the luminance value, over the color space, of the one or more pixels, when the determined luminance value of each of the adaptively modulated one or more pixels is lesser than a second pre-defined threshold. Further, a pixel flickering submodule (not shown in FIGS.) is configured to flickering a region of pixels to transmit the one or more data symbols. The one or more data symbols encode a plurality of bits of the information, based on flickering the region of pixels. The region of pixels encoding a symbol is an arbitrary two-dimensional shape belonging to a set of shapes, e.g., the set of alphanumerical characters or standard shapes such as circle, ellipse, heart, square etc. This set consists of shapes which need not be orthogonal. All we need is to train a decoder to be able to recognize each of them robustly in the presence of other shapes from the set and in the presence of noise.

The information encoding module further comprises the pixel flickering submodule. The pixel flickering submodule is configured to perform at least one of an intensity flickering and a color flickering the region of pixels based on determining if each region of the region of pixels comprises an intensity above a pre-defined intensity threshold. Further, the pixel flickering submodule is configured to determine the shape of the region of pixels for flickering at least one of a boundary and a rim of the region of pixels. Furthermore, the pixel flickering submodule is configured to modify one or more pixel values the region of pixels based on different values in one or more consecutive frames using a symmetrical modulation technique. Furthermore, the pixel flickering submodule is configured t flicker the boundary and an interior of the region of pixels to transmit an additional bit of information. The additional bit of information corresponds to a direction of flickering of the region of pixels. The one or more pilot symbols comprises a fixed direction of flickering, wherein the direction of flickering of the one or more pilot symbols is determined using the additional bit of information. The one or more pilot symbols are placed in fixed position known to the information decoding module, wherein at least one of the one or more data symbols and the one or more pilot symbols are packed in a fixed pattern to implement a plurality of bits of information.

To convert the one or more frames into a color space, the frame detecting submodule is further configured to convert from a standard color space to the color space. Further, the frame detecting submodule is configured to cumulatively accumulate over the one or more frames for the energy accumulation. Furthermore, the frame detecting submodule is configured to correct one or more perspective distortions using the detected frame boundary. Furthermore, the frame detecting submodule is configured to detect the one or more shapes of each of the one or more data symbols, using contour detection techniques. Additionally, the frame detecting submodule is configured to determine one or more coded bits based on the detected one or more shapes and decode the one or more coded bits using a forward-error-correcting-code technique.

For example, the system 102 uses a combination of intensity and color flickering depending on whether a region has intensity above a certain threshold or not. To recognize the shape of the region of pixels the system 102 flickers only the boundary or the rim of the region of pixels, this helps in reducing the perceived flicker to the human viewer, thus allowing the system 102 to decode more robustly at the information decoding module 208 (e.g., decoder). Flickering is changing the value of a pixel in frame #1 in by, say+a, along one particular channel in the color space any system is working in, and changing the value of the same pixel by −a in the immediate next frame. The system 102 changes the pixel values not by the same value 'a' in the consecutive frames. Sometimes to 'cancel' the flickering, so that the flickering merges perfectly with the background, it is necessary to have asymmetrical modulation, i.e., +a in frame #1 and −b in frame #2, where 'a' need not equal 'b'.

The system 102 flickers the boundary as well as the interior of the region of pixels to transmit an extra bit of information. This extra bit of information conveys the direction in which the region of pixels is flickering (e.g., we add+0.5 to pixels in that region in frame #1 and then in the consecutive next frame #2, we add a −0.5 to the same pixels OR this could be vice-a-versa. This allows the system 102 to transmit an extra bit of information). Using a set of symbols such as the pilots, which have a fixed direction of flickering (as mentioned in the previous point), to allow the decoder to determine the direction of flicker. These pilot symbols are placed in fixed position known to the information decoding module 208 (e.g., receiver), e.g., a column of symbols either in the center or to the left or the right of the frame. The system 102 performs the rpyramidU' flickering to transmit the extra bit of information, which allows us to make the decoder more robust. The system 102 packs the one or more data symbols in a fixed pattern such as a regular grid, in a frame, to convey as many information bits as possible. The same symbols or information bits are transmitted over several frames. This allows the decoder to apply energy accumulation to determine robustly what information was transmitted.

Further, the system 102 flickers a larger region of pixels to convey the portion of the frame where the information resides. For example, this could be flickering of a few pixels along the boundary of the frame if a frame detector is used at the decoder. This allows detection of the frame which aides to reliably decoder the transmitted information in the interior of the frame. The frame detection also allows to correct for perspective distortions. This larger region need not be the frame boundary and can be any region inside the frame.

In another example, the system 102 at the information decoding module 208, the system 102 may first convert from RGB to the appropriate color space (OK LAB or any other equivalent perceptual space). Then, the system 102 performs cumulative energy accumulation of frames as follows: set decoded_frame=first frame. 'First frame' is the first frame that the decoder/receiver captures. It could be a combination of two frames. Then, the system 102 performs the following for a pre-determined number of times (say 15 or 20 frames): decoded_frame=decoded_frame+decoded_frame− next_frame, where next_frame is the next consecutive frame that is captured by the receiver. This energy accumulation is crucial because it helps 'light up' the transmitted symbols (e.g., similar to LED lights) in the noisy area of the background frame, which can be then easily fed to a detector (based on modern deep neural nets or otherwise) to determine the shape of the symbols and estimate the transmitted information.

After the energy accumulation, the decoder corrects any perspective distortions using the detected frame boundary. After the perspective distortion correction, the decoder passes the result to a shape detector which can detect the shapes of individual symbols robustly. This shape detector could be using standard contour detection techniques in computer vision/image processing OR it could be a modern neural network architecture which has been pre-trained on the set of shapes used in the transmission of the symbols.

Once the symbols have been decoded the coded bits are revealed and they are further decoding using the forward-error-correcting-code decoder. The above constitutes an epoch of decoding. To add more redundancy, we decode over several such epochs, say 3. And then the system 102 can further apply majority decoding to boost the robustness of the decoder. When multiple channels in the color space are used to transmit the information (e.g., in the intensity and color channels) then jointly decode both the channels to make the decoder more robust.

In an exemplary embodiment, the information decoding module 208 executes the content receiving submodule 220 to receive recorded content corresponding to the media content, recorded through a camera associated with the user device 106. In an exemplary embodiment, the information decoding module 208 executes the frame detecting submodule 222 to detect the one or more frames from the recorded content. The detected one or more frames are converted into a color space.

In an exemplary embodiment, the information decoding module 208 executes the symbol detecting submodule 224 to detect at least one of the one or more data symbols, the one or more pilot symbols, and the one or more scannable barcodes in the detected the one or more frames. In an exemplary embodiment, the information decoding module 208 executes the symbol extracting submodule 226 to extract the one or more data symbols from the one or more frames based on at least one of the the grid and the fixed pattern. The one or more data symbols are extracted based on a position of the column of the one or more pilot symbols in each of the one or more frames. Further, the symbol extracting submodule 226 may be configured to detect lines in the one or more frames using a line detection technique to extract one or more quadrilaterals corresponding to a region of interest in each of the one or more frames. The symbol extracting submodule 226 may be configured to detect one or more edges and one or more contours in the detected lines to determine the one or more shapes of the one or more data symbols. Furthermore, the symbol extracting submodule 226 may be configured to determine a degree of angle of tilt of the one or more contours. Additionally, the symbol extracting submodule 226 may be configured to analyze iteratively one or more errors in determining the one or more data symbols. Furthermore, the symbol extracting submodule 226 may be configured to output on the display of the display device 116, the correctly determined one or more data symbols.

In an exemplary embodiment, the information decoding module 208 executes the bit value detecting submodule 228 to detect one or more bit values of each data symbol, by analyzing a color difference between each of the one or more frames and the one or more shapes of the one or more data symbols. The color difference of the one or more data symbols and the one or more pilot symbols is cumulatively accumulated over the one or more frames for an energy accumulation to analyze the color difference between each of the one or more frames and the one or more shapes of the one or more data symbols.

In an exemplary embodiment, the information decoding module 208 executes the information generating submodule 230 to generate the information based on at least one of the detected bit values of the one or more frames and the detected one or more scannable barcodes. In an exemplary embodiment, the information decoding module 208 executes the information outputting submodule 232 to output the generated information through at least one of displaying on a display of the user device 106 and transmitting the information to one or more digital delivery destination platforms. Outputting the generated information comprises displaying, but is not limited to, one or more products, one or more recommendations, one or more services, and relevant information regarding the media content to a user of the user device for interacting with the information in a unobtrusive mode.

Figure 3A:
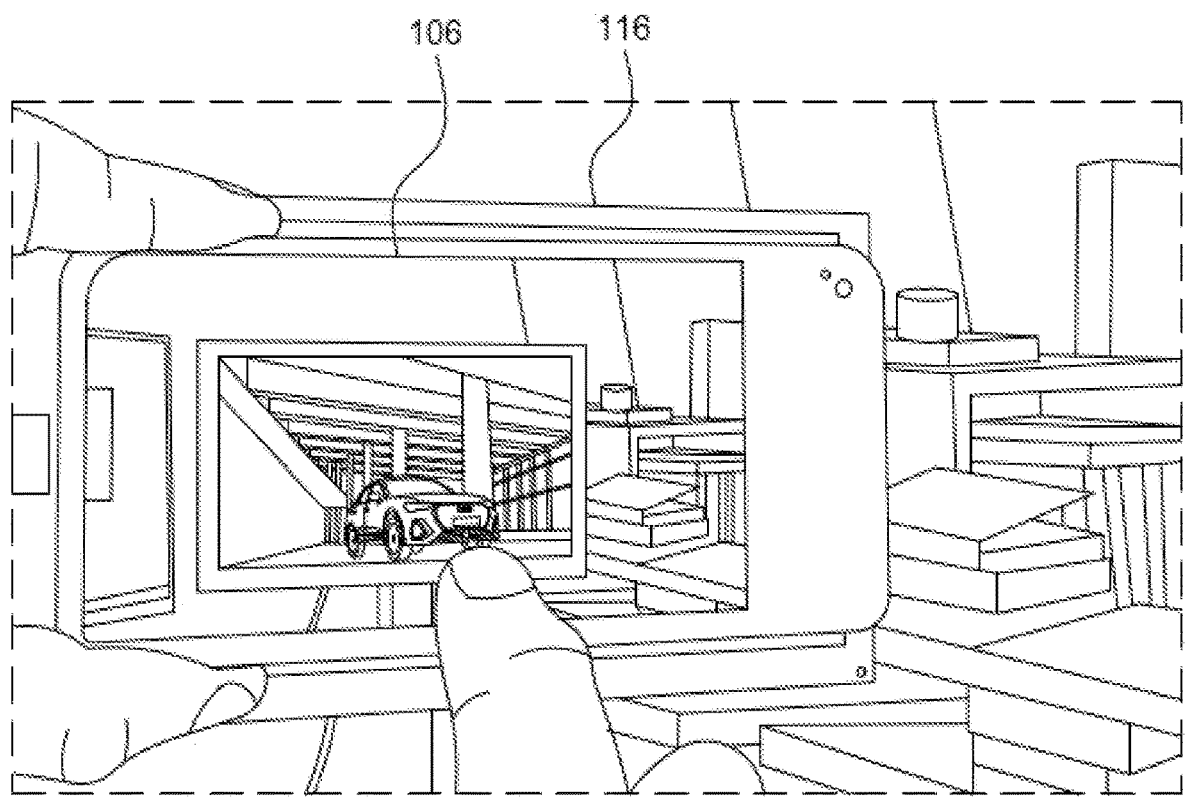
FIG. 3A illustrates an exemplary schematic representation of a user associated with a user device capturing a video of a media content being displayed on a display device such as a television, according to an example embodiment of the present disclosure.

FIG. 3A illustrates an exemplary schematic representation of a user associated with the user device 106 is capturing a video of media content being displayed on a display device 116 such as a television, according to an example embodiment of the present disclosure. For example, consider the information to be displayed on the display device 116 may be a website link address embedded in a video clip of a duration of about 10 seconds. The system 102 may convert the website link address to, for example, 7 characters (56 bits of information) using a standard universal resource locator (URL) converting/shortening technique. The system 102 may use a standard temporal-complementary frames (TCF) methodology, by alternating frames at 60 Hz. To transmit the data for any video, the system 102 may up-sample and/or interpolate, the original video with a frame rate lower than 60 Hz to a frame rate of at least 60 Hz. The up-sampling and/or interpolating may be performed using techniques such as optical flow techniques, a sample-and-hold or linear interpolation and/or deep neural networks to obtain better up-sampled and/or interpolation results.

Further, the system 102 may adaptively modulate the up-sampled video to over both color (chromatic) and luminance channels using a standard color space (RGB), an orthogonal color space, OKlab techniques, and the like. The color space may not have been used for the application of unobtrusive screen-camera communications. There may be three channels in the color space such as, 'L' corresponding to a luminance, 'a' corresponding to a green-red channel, and 'b' corresponding to a blue-yellow channel. The color space may satisfy the requirement of orthogonal space, hence changing intensity over one channel does not affect the output of the other channels. Further, the blending of colors may be closer to a human vision than all existing color spaces. As a consequence, sufficient modulation depth may be obtained to decode the information while still maintaining the constraint of information transmission being invisible to the human vision.

The system 102 may adaptively display the information depending on the frame. Luminance flicker depends on the refresh rate and also on the value of the pixel luminance. The system 102 may adaptively display the information based on checking, for every pixel on which data is displayed (to be transmitted to the user device 106), the luminance value to determine if the luminance value is greater or lesser than a first pre-defined threshold value, for example, 0.3. for example, if the luminance value is lesser than 0.3, then the information may be displayed on the display device 116 by modulating, by the system 102, the L-channel (luminance) rather than the 'a' or the 'b' channels (color). If the luminance value is greater than and lesser than a second pre-defined threshold value (0.6), then the information may be displayed on the display device 116 either using the 'a' or the 'b' channel (color). For exposition consider the 'a' channel.

The system 102 may display the information on the display device 116 using either bit 0 or bit 1, over a large region of pixels on the screen, due to the noise in the channel and the blending of neighboring pixels on the camera pixels. For example, a square box of size, for example, 100×100 screen pixels, is used to display bit 0. The regions are referred to as data/elementary symbols for transmission or just symbols for short. The data symbols are placed on the grid and the fixed pattern, as depicted in a data frame 302 of FIG. 3B, and the grid pattern may be known to the system 102. The background of the data frame 302 represents '0' modulation depth. 306 represents a modulation depth of '−1' and 304 represents a modulation depth of '+1'. To display bit 1 of the information, the system 102 may use opponent colors. For example, '+1' is displayed by increasing the value of a pixel along the 'a' channel to 'a+d', for frame 'F1' (where 'a' is the original value along the 'a' channel) and by decreasing the value of the pixel to 'a-d' on a subsequent frame 'F2'. For bit 0, 'a-d' may be displayed on 'F1' and 'a+d' on 'F2'.

However, due to non-synchronization of the display device 116 and the user device 108 or due to split frames, the opponent colors technique which relies on color difference is subject to ambiguity. To address this issue, the system 102 uses a column of the one or more pilot symbols, carrying only one bit of information and known to the system 102. These pilot symbols can be placed at the left, right, or in the middle of a data frame, depending on the frame content, however, remain fixed for the duration of the video clip. In another example, to display an additional bit of information per symbol on the display device 116, the system 102 encodes the information in the one or more shapes of the symbol, such as, by using elliptical regions with different tilts to represent 'bit 0' and 'bit 1'. Using elliptical regions, with the ratio of the major axis to the minor axis around 2, the major axis tilted by 45 degrees to represent bit 1, and the major axis tilted by 135 degrees to represent bit 0. The system 102 may encode a plurality of degrees of freedom into the shape of a symbol. For example, a symbol may have shapes such as a heart, a club, a diamond, a spade, and the like. The symbol may encode two bits in the shape and the color difference encodes 1 bit giving 3 bits per symbol. This approach can be combined with the use of letters and numbers as symbols, to encode up to 6 bits per symbol. The data symbols include approximately 5 bits per symbol, and the color includes 1 bit per symbol, i.e., 6 bits per symbol. The system 102 may use optical recognition or classification techniques, such as neural networks (NN), e.g., deep convolutional neural networks, optical character recognition based neural networks, and the like to decode the one or more data symbols. Consider, the tilted ellipses encode an additional bit of information to display two bits per symbol on the display device 116. For example, the one or more pilot symbols can be a column of discrete symbols or a continuous column, where pixels are modified with '+1' (for example) in first frame and '-1' (for example) in second frame. If the one or more pilot symbols is a column of discrete symbols, the shape of the data symbol may be one of the shapes from the set of the used shapes. This shape for the one or more pilot symbols may be distinct from the shapes used for the one or more data symbols. For example, in the images, if the one or more data symbols are ellipses (or "rice grains") at an angle of 45 degrees or 135 degrees, then the shapes of the one or more pilot symbols are squares. The squares are distinct in shape as compared to ellipses.

Furthermore, consider that the flicker perceived by the human vision is not solely determined by the modulation depth and luminance of the region, but also determined by the area of the region. To reduce flicker, the system 102 uses a modulation technique such as the pyramidU technique. The pyramidU technique modulates the outermost rim of the region at the highest allowed depth, and gradually decreases the modulation depth towards the center before increasing again towards the other side, creating a shape resembling the letter 'U'.

The video content displayed on the display of the display device 116 may not occupy the entire display, even when presented in full-screen mode. As such, it is necessary for the system 102 to detect the frame, rather than the entire screen, to identify the region of interest. To facilitate this, the system 102 may modulate a specific number of pixels (e.g., 15) along the frame boundary. Through the use of the TCF technique, the border becomes imperceptible to human vision, yet remains detectable by the user device 106, enabling the extraction of the frame. The system 102 modulates the 'a' channel, the 'L' channel, or both, to achieve optimal detection rates. Additionally, the raw information bits, totaling 56 bits, may be appended by the system 102 with an 8-bit Cyclic redundancy check (CRC) to form a 64-bit string. The system 102 may encode the 64-bit string using, but not limited to, a low-rate fountain code, a reed-Solomon codes, a Bose-Chaudhuri-Hocquenghem (BCH) codes, or any other forward error-correction (FEC) scheme capable of correcting burst erasures and errors, and combination thereof, resulting in 252 bits, which facilitates data recovery in the event of burst erasures. Each symbol is comprised of 2 bits, and the resulting 126 data symbols are used to construct the frame.

Figure 3B:
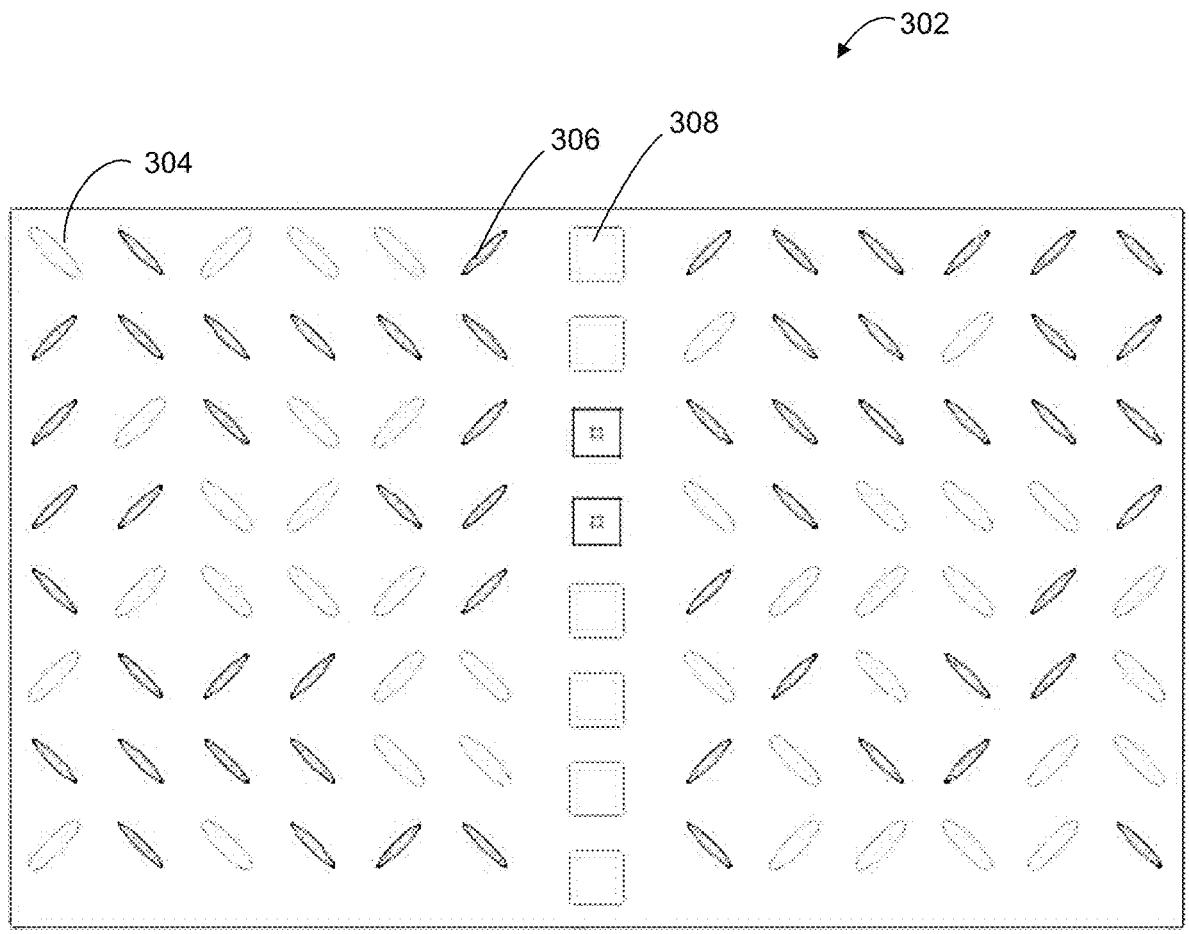
FIG. 3B illustrates a symbolic diagram representation of one or more data symbols, according to an example embodiment of the present disclosure.

A constructed data frame 302 is depicted in FIG. 3B. In the data frame 302 depicted in FIG. 3B, 304 indicates a bit value of '+1' (e.g., yellow color), and 306 indicates a bit value of '0' (e.g., blue color). The data symbols tilted at a 45-degree angle clockwise represent '+1', while the data symbols tilted at a 135-degree angle represent a value of '0'. The pilot symbols 308 are located in the center of the data frame 302, and employ the pyramidU modulation technique. FIG. 3B represents frame F1. For the subsequent frame 'F2', the shapes remain consistent, however, the colors (e.g., yellow and blue) are reversed.

Figure 3C:
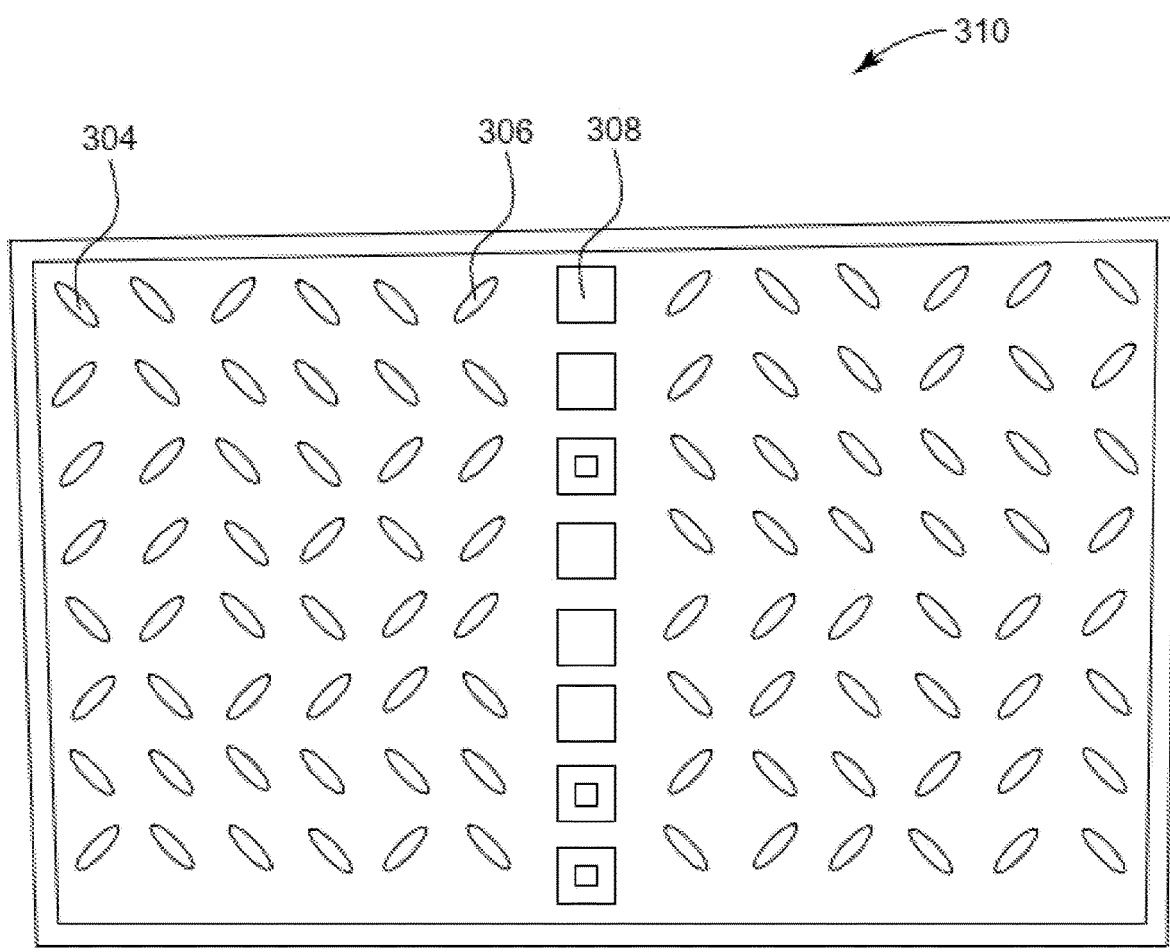
FIG. 3C illustrates a symbolic diagram representation of the accumulation of energies associated with one or more data symbols in a plurality of frames, according to an example embodiment of the present disclosure.
Figure 3D:
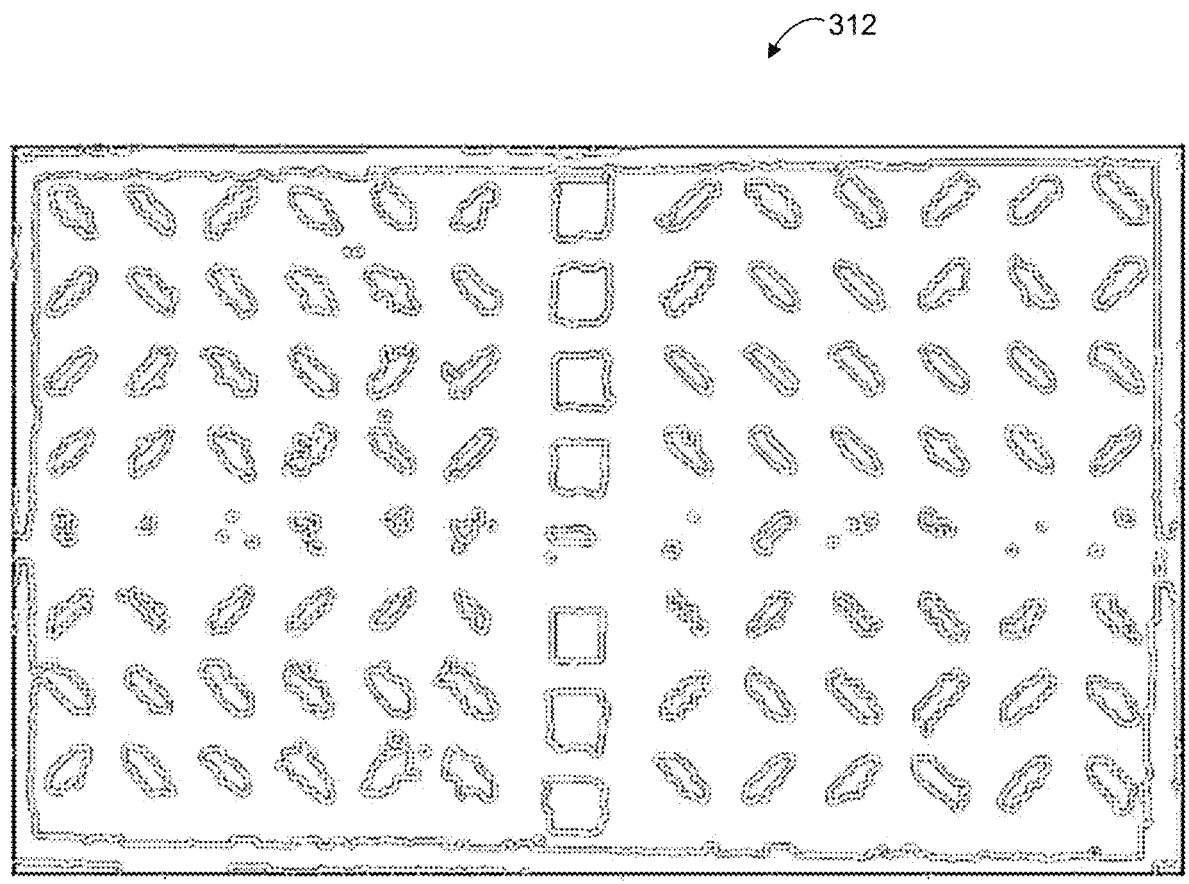
FIG. 3D illustrates a symbolic diagram representation of a perspective distortion in the accumulated plurality of frames with one or more data symbols, according to an example embodiment of the present disclosure.

The user may record using the user device 106, a portion of the video displayed on the display of the display device 116, for five seconds, using a standard smartphone with 120 FPS sampling, as depicted in FIG. 3A. The system 102 demodulates and decodes the recorded video. Due to the low SNR regime in which the system 102 operates, it is necessary to accumulate sufficient energy to demodulate the symbols. To accomplish this, the system 102 may consider three epochs, each consisting of 15 frames of the recorded video clip. The three epochs are randomly selected from the first-third, middle-third, and last-third of the clip, providing sufficient diversity to mitigate the effects of hand-held motion or other noise. For the first epoch, the system 102 transforms the frames of the video clip to the OKLAB color space. The transformed frames are then accumulated by the system 102 to obtain the energy for the data symbols. More specifically, the decoded frame is set by the system 102, to the first transformed frame, and the difference between the decoded frame and the next transformed frame is added to the decoded frame (decoded frame=decoded frame+decoded frame−next frame). This is repeated for the next 15 frames. The result of the accumulation is the energy of data symbols. The accumulation is an image 310 in which only the data symbols, border pixels, and pilots are visible, as shown in FIG. 3C. The effect of frame splitting is noticeable in the 5th row of FIG. 3C, where the symbols are completely erased.

Figure 3E:
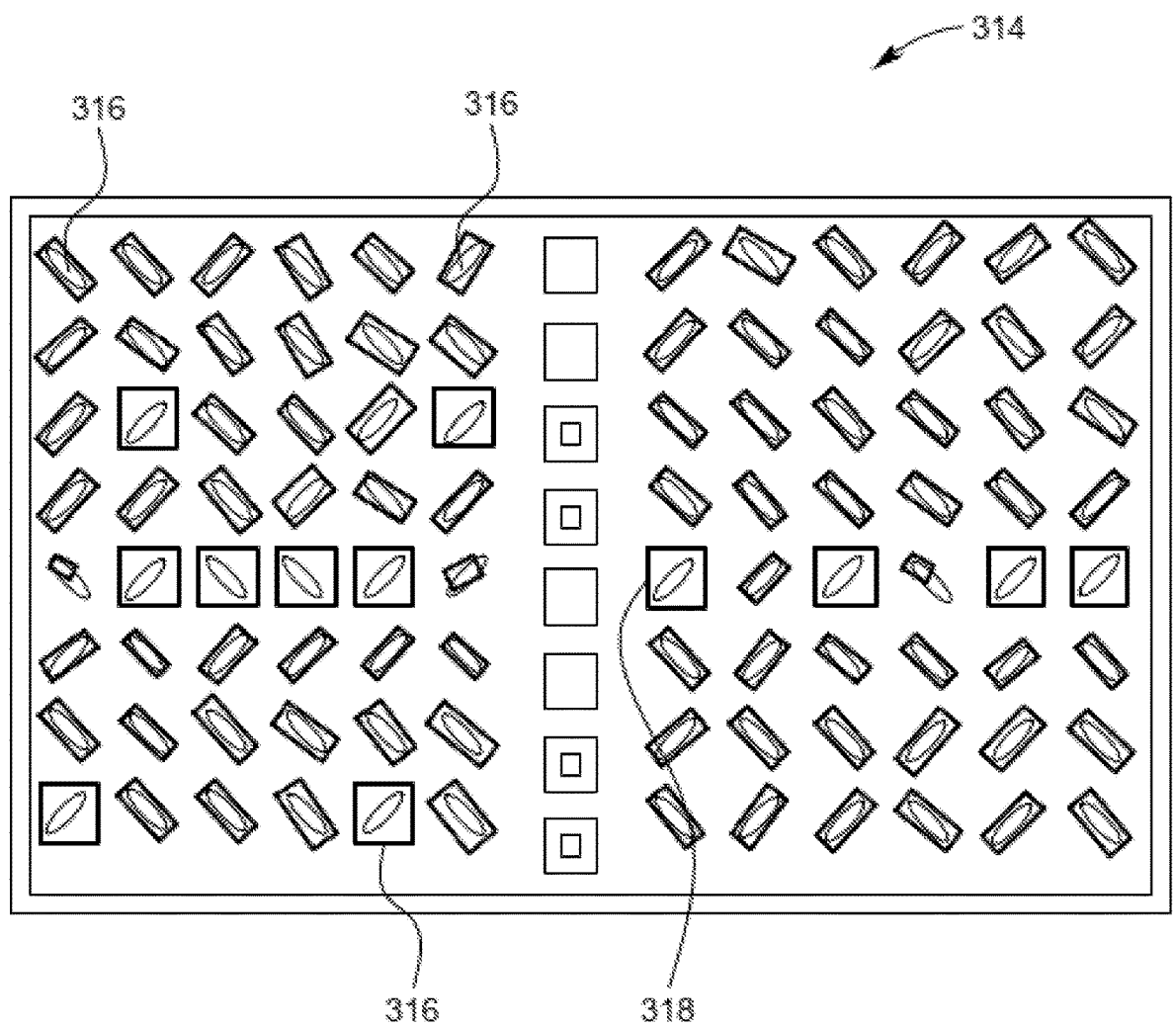
FIG. 3E illustrates a symbolic diagram representation of correctly decoded data symbols and errors in decoding the data symbols, according to an example embodiment of the present disclosure.

Further, the system 102 uses the resulting image 310 to process by a screen detection routine which employs Hough transform for line detection and to extract the quadrilateral corresponding to the region of interest. Perspective distortion is corrected using standard functions from an OpenCV library. The resulting image 310 is then passed through a Canny edge detector followed by a contour detection. The system 102 processes the detected contours to determine whether the contour corresponds to an ellipse tilted 45 degrees or by 135 degrees. If there is ambiguity, which happens for the 5th row in a screen detected image 312 of FIG. 3D, then that bit is declared to be erasure. For each elliptical region, the system 102 determines the average of the underlying pixels, and the resulting value is used to determine the corresponding bit (either +1 or 0). The system 102 uses the pilot symbols 308 to determine whether the resulting bit values need to be flipped due to frame split. The system 102 decodes the resulting bit stream using an erasure-decoder to recover the 64 raw bits. The system 102 performs the CRC check to ensure that the 56 bits of information have been correctly obtained. The final result is a decoded image 314 in which the green boxes denote correctly decoded symbols and the blue box denotes an error, as depicted in FIG. 3E.

If the CRC check fails in the first epoch, the system 102 proceeds to perform the same steps for the second epoch. If the second epoch also fails, repetition decoding is performed. Specifically, if a particular bit is erased in the first epoch but has been decoded in the second epoch, that bit is declared to be known and set to the value in the second epoch. This reduces the number of erasures and gives the fountain code a better chance to recover the data. If there is still a failure, the third and last epoch is decoded as above, and repetition decoding is performed with the previous epochs.

Figure 4:
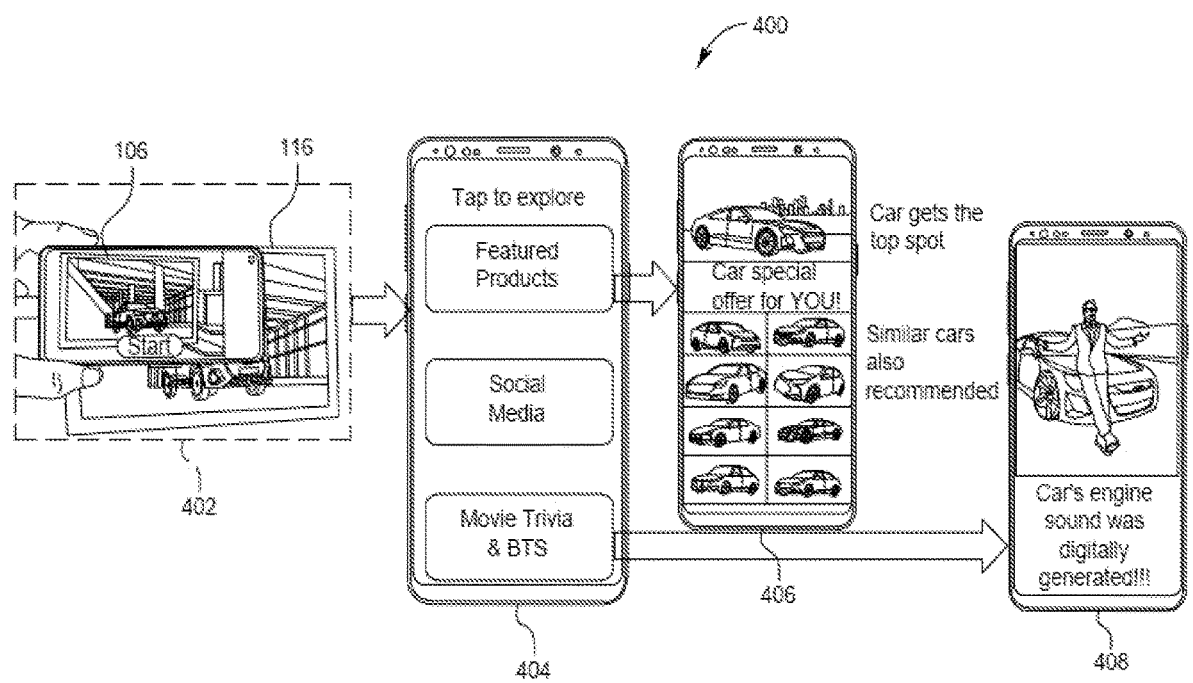
FIG. 4 illustrates a flow diagram representation of a method for providing an enriched viewing experience and curated offers to a user viewing a television, according to an example embodiment of the present disclosure.

FIG. 4 illustrates a flow diagram representation of a method 400 for providing an enriched viewing experience and curated offers to a user viewing a television, according to an example embodiment of the present disclosure.

At step 402, the method 400 includes receiving, by the system 102, a recorded video of a video clip displayed on the display device 116 such as the television, from the user of the user device 106.

At step 404, the method 400 includes displaying a featured products option, a social media option, a movie trivia, and a behind-the-scenes option (which is information related to the video), on the user device 106. For example, the system 102 also receives a selected option from the user device 106. The user taps on the desired object/product on the display of the user device 106, while watching the video on the television. The system 102 may estimate where the user tapped, giving an idea of the region of interest in the image. The system identifies, using a segmentation and a classifier algorithm, all objects in the frames of the video clip.

At step 406, the method 400 includes recommending special offers to the user, with the car getting the top spot, based on the video clip, when the user selects the featured products option on the user device 106. Similar cars are also recommended to the user.

At step 406, the method 400 includes providing, by the system 102, information reading the movie trivia, when the user selects movie trivia information on the user device 106. For example, the movie trivia information includes that the car's engine sound was digitally generated.

Exemplary Scenario 1

Figure 5A:
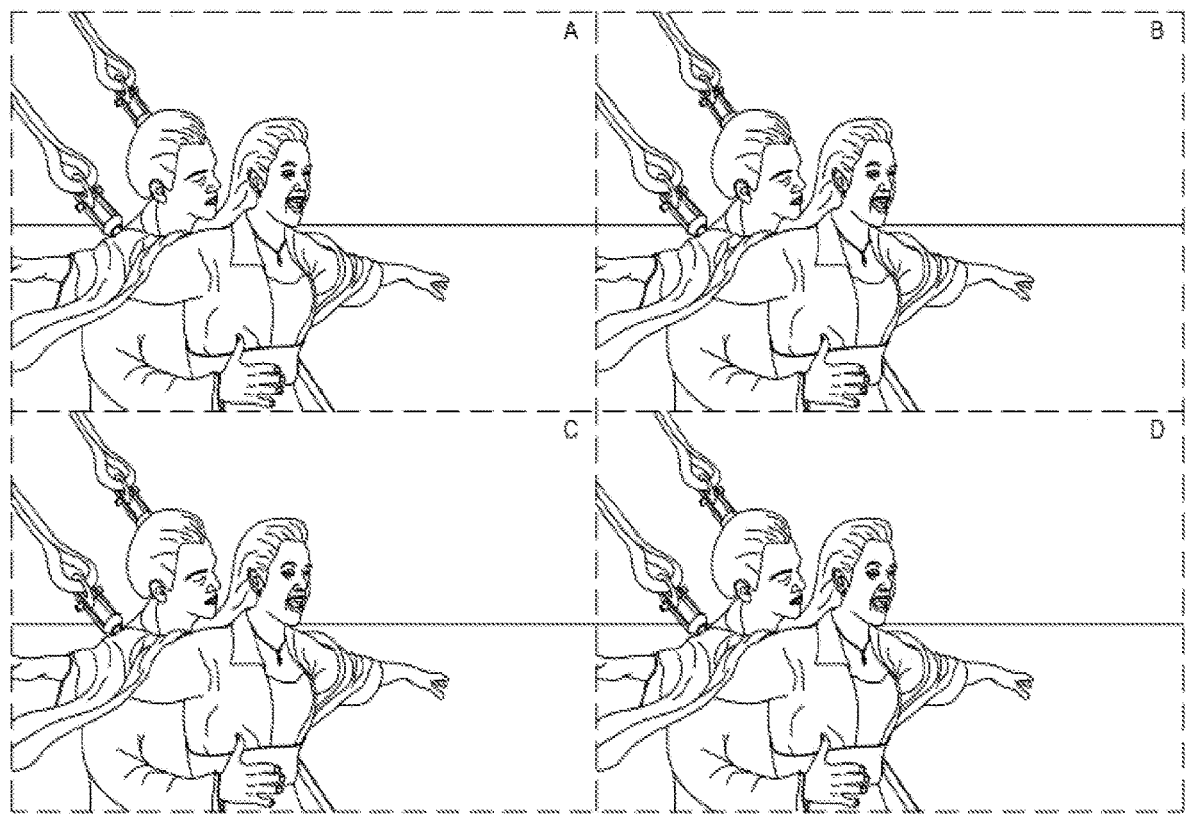
FIGS. 5A and 5B illustrate graphical representations of displaying one or more indicia on the screen of the display device, upon adaptively displaying the modulated one or more pixels, according to an example embodiment of the present disclosure.

FIG. 5A illustrates a graphical representation of displaying one or more indicia (A, B, C, D) on the screen of the display device 116, upon adaptively displaying the modulated one or more pixels, according to an example embodiment of the present disclosure. For example, the system 102 may enable over-the-top (OTT) streaming services to strategically place information nuggets, advertisements, coupons, and offers in any particular scene of their videos without disrupting the viewing experience of the users. This offers an opportunity for streaming services to enhance their customers' experience by providing a seamless viewing experience. Additionally, the present disclosure provides a new possibility for collaboration between streaming services and brands (A, B, C, D shown in FIG. By placing advertisements strategically, each streaming service (A, B, C, D)

can improve revenue stream while providing a more tailored experience to the users. To facilitate this interaction, each streaming service can display the respective logo (A, B, C, D) briefly at the top of the screen of the display device 116, to alert the user of forthcoming information of interest. If the user chooses to interact with the content, the user can point using the camera of the user device 106 at the screen of the display device 116, to obtain information tailored to the user preferences, which can be set in the streaming service's application.

Exemplary Scenario 2

Currently, it is becoming increasingly difficult to verify the authenticity of visual content and websites on the internet due to the emergence of deep fakes. Perceptual hash technology is massively improving, however, there is still a need for a reliable method to verify the integrity of visual content. The system 102 embeds a cryptographically signed perceptual hash in the video to authenticate the source and integrity of the content. The system 102 uses the cryptographically signed perceptual hash of the entire video clip and displays invisibly on the display device 116. If the video is being viewed on a smartphone or a tablet, then the integrity of the video content can be verified based on:

- the channel is virtually noiseless since the video is being watched directly on a smartphone and is not pointed to another screen.
- the system 102 up-samples the video to 60 FPS, and data is added using TCF. For each pixel, where data is added, the "a" channel (or "b" and "L" channels) is changed by some amount d (modulation depth). This amount d is such that for all pixels where data is present, the TCF frames added give back the original frame. This is only true if the original video is created at 24 FPS or 30 FPS, as up-sampling by sample-and-hold technique may provide that each original frame is repeated at least twice. Such a d>0 can always be found unless the pixel is fully saturated to [0,0,0] or [255,255,255]. In these cases, the original pixels are slightly modified, e.g., [255,255,255] is changed to [252,252,252], to accommodate the data modulation.
- the system 102 creates a cryptographically-signed perceptual hash for the entire video, and the resulting bits are embedded into the video as proposed in this invention.
- the system decodes the embedded bits received from the user device 106. The private key at the receiver is used to retrieve the perceptual hash. Then, the received frames are added pairwise to get the original frames. Finally, the perceptual hash of the original frame is computed and matched with the embedded one.

Exemplary Scenario 3

Consider a scenario of enhancing the effectiveness of digital billboard advertising through targeted engagement. Conventional billboard advertising has been limited in targeting and engagement, leading to a low impact on potential consumers. The system 102 enables targeted engagement with consumers by allowing them to receive curated information based on their preferences and interests. Specifically, the system 102 enables a consumer to interact with a digital billboard or banner by pointing their smartphone toward the display. The digital billboard can then send a web link to the consumers smartphone, which is curated based on the consumers preferences and interests. For instance, the web link may include information about product discounts or locations where the advertised product can be purchased near the consumer's residence.

By using the system 102 the advertisers can enhance the effectiveness of their digital billboard advertising by delivering targeted and engaging content to consumers. The system 102 also enables advertisers to gather data on consumer preferences and interests, thereby allowing them to refine their advertising strategies and improve overall marketing effectiveness.

Exemplary Scenario 4

Figure 5B:
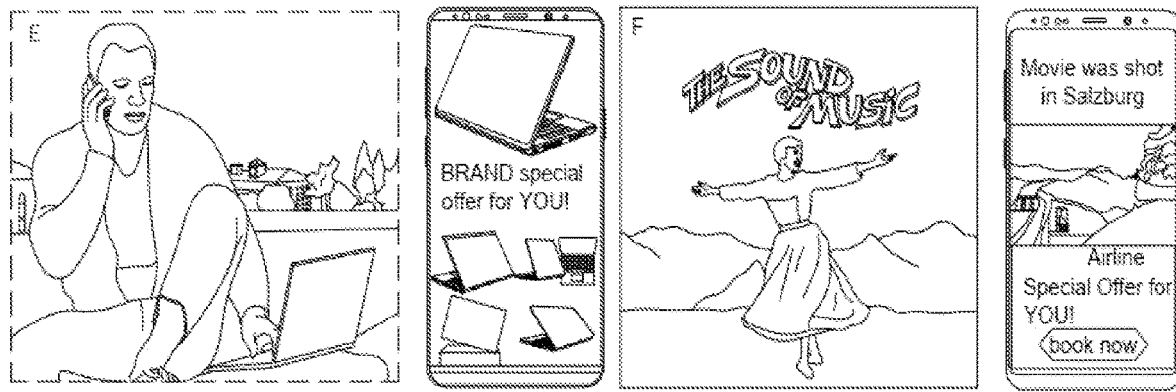
Figure 5C:
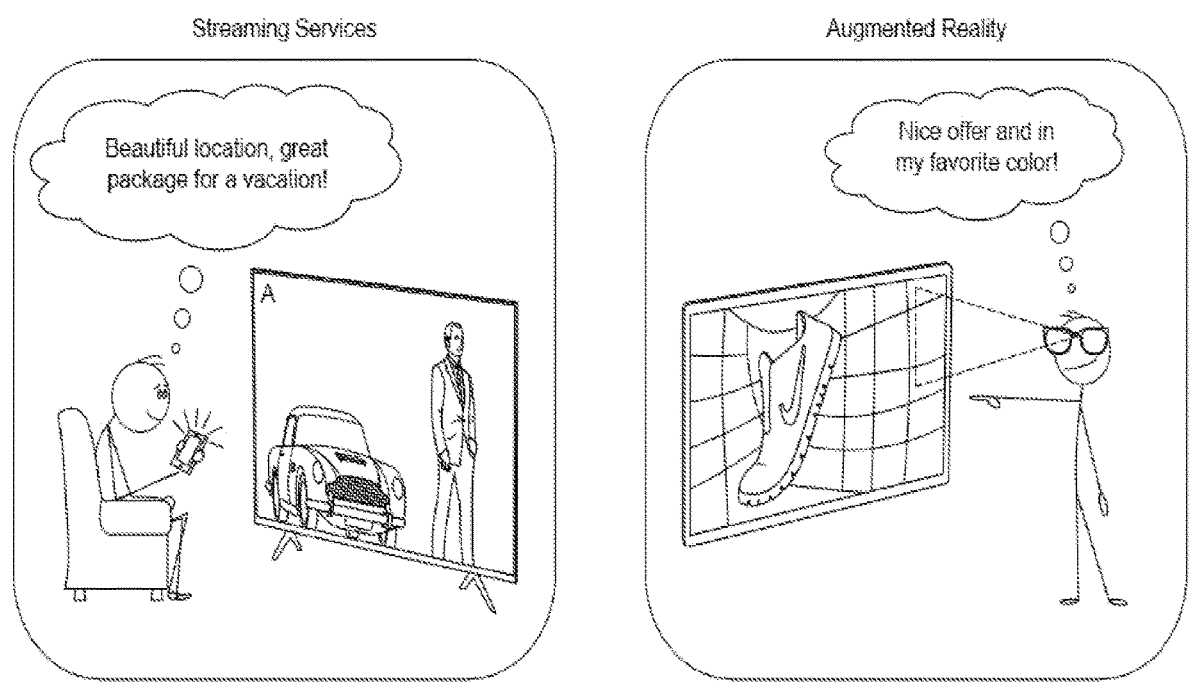
FIG. 5C illustrates a graphical representation of personalized interaction with digital screens through smartphones and smart glasses, according to an example embodiment of the present disclosure.

Consider a video-enabled augmented reality (AR) scenario as shown in FIG. 5C. In one embodiment, a user can use the smartphone to access digital content related to products or services displayed on a screen of the display device 116. The system 102 may recognize and identify the specific scene or product being displayed through embedded information and provide targeted and personalized information to the user based on their preferences. The system can also provide an AR experience, allowing the user to view the product in 360 degrees and receive discounts and coupons.

In another embodiment, the system 102 may enable social media interaction over a video clip. The system can identify unique scenes within the video and allow the user to comment and share specific scenes on their social media account as shown in FIG. 5C. This feature can potentially enable viral marketing.

Further, the system 102 may facilitate communication in a multilingual environment. For instance, in a restaurant, the system can recognize the user's language preference and provide the menu in their language along with discounts and offers.

Further, the system 102 may transmit embedded information to the user via email, when the user takes a screenshot while watching a video on the user's device 106. The underlying few frames are processed to extract the embedded information. The system 102 enables users to obtain information regarding specific objects/products in a video scene by tapping on the desired object on the smartphone screen. The system 102 estimates where in the image the user tapped, runs a segmentation and classifier algorithm to get all the objects in the scene, and opens the website for each link to find which classified object closely matches. Further, the system 102 provides websites to viewers based on a particular scene as shown in FIG. 5C. The highest bidders get the top spots, and the viewer is served a page with information and offers at the top and then a list of other products (which are of a similar type and built as the top product) with their information and offers.

Further, the system 102 incentivizes users to watch advertisements by awarding reward coins, which can be used to reduce the subscription cost or buy merchandise in online stores. The system 102 boosts the data rate by encoding over both the 'a' and 'b' channels and transmitting a symbol defined by e.g., 100 degrees of freedom, which is then recognized by a neural network such as a modern deep neural network based on convolutional nets or transformer architecture, optical character recognition neural networks, and the like, to increase the data rate to 100 bits/symbols.

In addition, the system 102 displays invisible QR codes on the display device 116, using chromatic flicker fusion. The entire screen on the display device 116 is available to transmit the codes, thereby increasing the amount of information that can be transmitted.

Figure 5D:
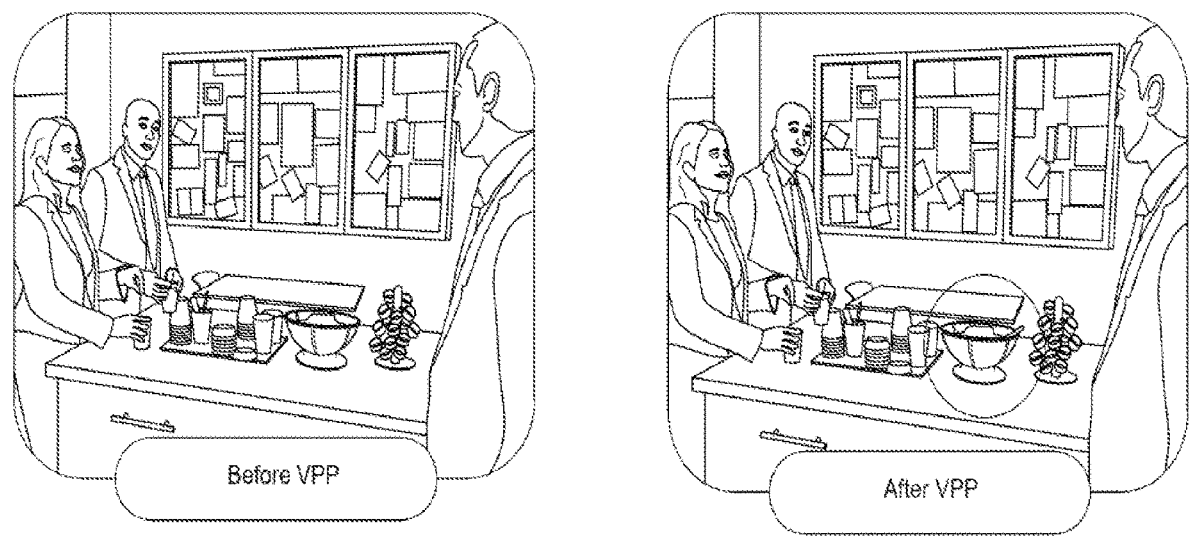
FIG. 5D illustrates a graphical representation of virtual product placement in media content being displayed on a television, according to an example embodiment of the present disclosure.

FIG. 5B illustrates a graphical representation of displaying one or more indicia (E, F) on the screen of the display device 116, upon adaptively displaying the modulated one or more pixels, according to an example embodiment of the present disclosure. The system 102 enables revenue streams for streaming/OTT platforms (e.g., E, F) by providing both ad-free and ad-based tiers. This enables platforms to hide information and ads within their content, thus increasing revenue through both tiers. Furthermore, the system 102 provides actionability on top of awareness, enabling product placement revenue. FIG. 5D illustrates a graphical representation of virtual product placement (VPP) in media content being displayed on a television. As depicted in FIG. 5D the VPP enables unobtrusive screen-camera communication, by adaptively displaying, each pixel, on a screen associated with the display device 116, without highly modulating/modifying/blending multiple neighboring pixels in the video. Additionally, the system 102 provides special offers such as brand offers to the user, providing further incentive for engagement as shown in FIG. 5B.

Platforms can offer insights and metrics on viewer engagement with brands. By integrating the system 102, platforms can offer detailed analytics on viewer engagement with the advertisements and information. This enables brands to better understand their audience and tailor their marketing strategies accordingly. The system 102 allows accessing ad-free tier subscribers who are highly engaged and have a higher chance to convert. These subscribers have a higher disposable income, making them an attractive target for advertising campaigns. By providing access to these subscribers, the system 102 enables the expansion of reach and increase in conversion rates for brands. The system 102 achieves this by displaying the information and the advertisements on a mobile device, allowing for measurable advertisements and precise retargeting. This direct-to-consumer approach enables increased revenue on advertising spend (ROAS), making it a cost-effective solution for brands to reach their target audience. Additionally, the system 102 allows for the collection of viewer engagement metrics, providing insights that platforms can offer to brands for better campaign optimization.

FIG. 6 illustrates a flow chart depicting a method 600 for managing encoded information in a real-time screen-to-camera communication environment, according to an example embodiment of the present disclosure.

At block 602, the method 600 may include converting, by one or more hardware processors 110, information into a pre-defined number of characters. At block 604, the method 600 may include generating, by the one or more hardware processors 110, one or more data symbols and one or more pilot symbols, and one or more scannable barcodes corresponding to the pre-defined number of characters. The one or more data symbols are generated in one or more shapes.

At block 606, the method 600 may include embedding, by the one or more hardware processors 110, for a pre-defined duration of media content, the generated at least one of the one or more data symbols the one or more pilot symbols, and the one or more scannable barcodes in each of one or more frames of the media content. The one or more data symbols are embedded as at least one of a grid and a fixed pattern on each of the one or more frames, and the one or more pilot symbols are embedded as a column of at least one of discrete pilot symbols and a single continuous column of a color on each of the one or more frames. At block 608, the method 600 may include adaptively modulating, by the one or more hardware processors 110, over at least one of a color channel and a luminance channel, a lightness channel, an intensity channel, one or more pixels, and a boundary in each of the one or more frames for the pre-defined duration, for the embedded one or more data symbols and the one or more pilot symbols.

At block 610, the method 600 may include adaptively displaying, by the one or more hardware processors 110, each pixel, on a screen associated with a display device 116, at least one of the scannable barcodes and the modulated one or more pixels, and the boundary in each of the one or more frames for the pre-defined duration, based on a luminance of each of one or more regions in each of one or more frames. The one or more frames are adaptively displayed as one or more temporal-complementary frames (TCF).

At block 612, the method 600 may include receiving, by the one or more hardware processors 110, recorded content corresponding to the media content, recorded through a camera associated with a user device.

At block 614, the method 600 may include detecting, by the one or more hardware processors 110, the one or more frames from the recorded content. The detected one or more frames are converted into a color space. At block 616, the method 600 may include detecting, by the one or more hardware processors 110, at least one of the one or more data symbols, the one or more pilot symbols, and the one or more scannable barcodes in the detected the one or more frames.

At block 618, the method 600 may include extracting, by the one or more hardware processors 110, the one or more data symbols from the one or more frames based on at least one of the grid and the fixed pattern. The one or more data symbols are extracted based on a position of the column of the one or more pilot symbols in each of the one or more frames.

At block 620, the method 600 may include detecting, by the one or more hardware processors 110, one or more bit values of each data symbol, by analyzing a color difference between each of the one or more frames and the one or more shapes of the one or more data symbols. The color difference of the one or more data symbols and the one or more pilot symbols is cumulatively accumulated over the one or more frames for an energy accumulation to analyze the color difference between each of the one or more frames and the one or more shapes of the one or more data symbols.

At block 622, the method 600 may include generating, by the one or more hardware processors 110, the information based on at least one of the detected bit values of the one or more frames and the detected one or more scannable barcodes. At block 624, the method 600 may include outputting, by the one or more hardware processors 110, the generated information through at least one of displaying on a display of the user device and transmitting the information to one or more digital delivery destination platforms. Outputting the generated information comprises displaying at least one of one or more products, one or more recommendations, one or more services, and relevant information regarding the media content to a user of the user device 116 for interacting with the information in an unobtrusive mode.

The method 600 may be implemented in any suitable hardware, software, firmware, or combination thereof. The order in which the method 600 is described is not intended to be construed as a limitation, and any number of the described method blocks may be combined or otherwise performed in any order to implement the method 600 or an alternate method. Additionally, individual blocks may be deleted from the method 600 without departing from the spirit and scope of the present disclosure described herein. Furthermore, the method 600 may be implemented in any suitable hardware, software, firmware, or a combination thereof, that exists in the related art or that is later developed. The method 600 describes, without limitation, the implementation of the system 102. A person of skill in the art will understand that method 600 may be modified appropriately for implementation in various manners without departing from the scope and spirit of the disclosure.

FIG. 7 illustrates an exemplary block diagram representation of a hardware platform 700 for implementation of the disclosed system 102, according to an example embodiment of the present disclosure. For the sake of brevity, the construction, and operational features of the system 102 which are explained in detail above are not explained in detail herein. Particularly, computing machines such as but not limited to internal/external server clusters, quantum computers, desktops, laptops, smartphones, tablets, and wearables which may be used to execute the system 102 or may include the structure of the hardware platform 700. As illustrated, the hardware platform 700 may include additional components not shown, and some of the components described may be removed and/or modified. For example, a computer system with multiple GPUs may be located on external-cloud platforms including Amazon Web Services, or internal corporate cloud computing clusters, or organizational computing resources.

The hardware platform 700 may be a computer system such as the system 106 that may be used with the embodiments described herein. The computer system may represent a computational platform that includes components that may be in a server or another computer system. The computer system may execute, by the processor 705 (e.g., single or multiple processors) or other hardware processing circuits, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the processor 705 that executes software instructions or code stored on a non-transitory computer-readable storage medium 710 to perform methods of the present disclosure. The software code includes, for example, instructions to gather data and analyze the data. For example, the plurality of modules 114 includes an information encoding module 206, and an information decoding 208. The information encoding module 206, and the information decoding module 208 include a plurality of submodules. The information encoding module 206 includes the plurality of submodules such as a character converting submodule 210, a symbol generating submodule 212, a symbol embedding submodule 214, a pixel modulating submodule 216, and a frame displaying submodule 218. Further, the information decoding module 208 includes the plurality of submodules such as, the content receiving submodule 220, the frame detecting submodule 222, the symbol detecting submodule 224, the symbol extracting submodule 226, the bit value detecting submodule 228, the information generating submodule 230, and the information outputting submodule 232.

The instructions on the computer-readable storage medium 710 are read and stored the instructions in storage 715 or random-access memory (RAM). The storage 715 may provide a space for keeping static data where at least some instructions could be stored for later execution. The stored instructions may be further compiled to generate other representations of the instructions and dynamically stored in the RAM such as RAM 720. The processor 705 may read instructions from the RAM 720 and perform actions as instructed.

The computer system may further include the output device 725 to provide at least some of the results of the execution as output including, but not limited to, visual information to users, such as external agents. The output device 725 may include a display on computing devices and virtual reality glasses. For example, the display may be a mobile phone screen or a laptop screen. GUIs and/or text may be presented as an output on the display screen. The computer system may further include an input device 730 to provide a user or another device with mechanisms for entering data and/or otherwise interacting with the computer system. The input device 730 may include, for example, a keyboard, a keypad, a mouse, or a touchscreen. Each of these output devices 725 and input device 730 may be joined by one or more additional peripherals. For example, the output device 725 may be used to display the results such as products, webpage, website, product information, catalog, and bot responses by the executable chatbot.

A network communicator 735 may be provided to connect the computer system to a network and in turn to other devices connected to the network including other clients, servers, data stores, and interfaces, for example. A network communicator 735 may include, for example, a network adapter such as a LAN adapter or a wireless adapter. The computer system may include a data sources interface 740 to access the data source 745. The data source 745 may be an information resource. As an example, a database of exceptions and rules may be provided as the data source 745. Moreover, knowledge repositories and curated data may be other examples of the data source 745.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

A description of an embodiment with several components in communication with each other does not imply that all such components are required. On the contrary, a variety of optional components are described to illustrate the wide variety of possible embodiments of the present disclosure. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the present disclosure be limited not by this detailed description, but rather by any claims that are issued in an application based here on. Accordingly, the embodiments of the present disclosure are intended to be illustrative, but not limited, of the scope of the present disclosure, which is outlined in the following claims.

What is claimed is:

1. A computer-implemented system for managing encoded information in a real-time screen-to-camera communication environment, the computer-implemented system comprising:
    one or more hardware processors; and
    a memory coupled to the one or more hardware processors, wherein the memory comprises a plurality of modules in form of programmable instructions executable by the one or more hardware processors, wherein the plurality of modules comprises:
        an information encoding module, wherein the information encoding module comprises:
            a character converting submodule configured to convert information into a pre-defined number of characters;
            a symbol generating submodule configured to generate at least one of one or more data symbols, one or more pilot symbols, and one or more scannable barcodes corresponding to the pre-defined number of characters, wherein the one or more data symbols are generated in one or more shapes;
            a symbol embedding submodule configured to embed, for a pre-defined duration of media content, the generated at least one of the one or more data symbols, the one or more pilot symbols, and the one or more scannable barcodes in each of one or more frames of the media content, wherein the one or more data symbols are embedded as at least one of a grid and a fixed pattern on each of the one or more frames, and the one or more pilot symbols are embedded as a column of at least one of discrete pilot symbols and a single continuous column of a color on each of the one or more frames;
            a pixel modulating submodule configured to adaptively modulate, over at least one of a color channel and a luminance channel, a lightness channel, an intensity channel, one or more pixels and a boundary in each of the one or more frames for the pre-defined duration, for the embedded one or more data symbols and the one or more pilot symbols; and
            a frame displaying submodule configured to adaptively display, each pixel, on a screen associated with a display device, at least one of the scannable barcodes and the modulated one or more pixels, and the boundary in each of the one or more frames for the pre-defined duration, based on a luminance of each of one or more regions in each of one or more frames, wherein the one or more frames are adaptively displayed as one or more temporal-complementary frames (TCF); and
        an information decoding module, wherein the information decoding module comprises:
            a content receiving submodule configured to receive recorded content corresponding to the media content, recorded through a camera associated with a user device;
            a frame detecting submodule configured to detect the one or more frames from the recorded content, wherein the detected one or more frames are converted into a color space;
            a symbol detecting submodule configured to detect at least one of the one or more data symbols, the one or more pilot symbols, and the one or more scannable barcodes in the detected the one or more frames;
            a symbol extracting submodule configured to extract the one or more data symbols from the one or more frames based on at least one of the grid and the fixed pattern, wherein the one or more data symbols are extracted based on a position of the column of the one or more pilot symbols in each of the one or more frames;
            a bit value detecting submodule configured to detect one or more bit values of each data symbol, by analyzing a color difference between each of the one or more frames and a shape of the one or more data symbols, wherein the color difference of the one or more data symbols and the one or more pilot symbols is cumulatively accumulated over the one or more frames for an energy accumulation to analyze the color difference between each of the one or more frames and the one or more shapes of the one or more data symbols;
            an information generating submodule configured to generate the information based on at least one of the detected bit values of the one or more frames and the detected one or more scannable barcodes; and
            an information outputting submodule configured to output the generated information through at least one of displaying on a display of the user device and transmitting the information to one or more digital delivery destination platforms, wherein outputting the generated information comprises displaying at least one of one or more products, one or more recommendations, one or more services, and relevant information regarding the media content to a user of the user device for interacting with the information in a unobtrusive mode.

2. The computer-implemented system of claim 1, wherein for adaptively displaying, each pixel, on the screen associated with the display device, for the modulated one or more pixels, and the boundary in each of the one or more frames, the information encoding module further comprises:
 a luminance determining submodule configured to determine a luminance value of each of the adaptively modulated one or more pixels;
 a luminance modulating submodule configured to modulate the luminance value, over the luminance channel, of the one or more pixels, when the determined luminance value of each of the adaptively modulated one or more pixels is lesser than a first pre-defined threshold;
 the luminance modulating submodule configured to modulate the luminance value, over the color space, of the one or more pixels, when the determined luminance value of each of the adaptively modulated one or more pixels is lesser than a second pre-defined threshold; and
 a pixel flickering submodule configured to flickering a region of pixels to transmit the one or more data symbols, wherein the one or more data symbols encodes a plurality of bits of the information, based on flickering the region of pixels;
 wherein the region of pixels encoding the one or more data symbols is an arbitrary two-dimensional shape belonging to a set of at least one of orthogonal shapes or non-orthogonal shapes.

3. The computer-implemented system of claim 2, wherein to flicker the region of pixels, the information encoding module further comprises:
 the pixel flickering submodule configured to:
  perform at least one of an intensity flickering and a color flickering the region of pixels based on determining if each region of the region of pixels comprises an intensity above a pre-defined intensity threshold;
  determine the shape of the region of pixels for flickering at least one of a boundary and a rim of the region of pixels;
  modify one or more pixel values the region of pixels based on different values in one or more consecutive frames using an symmetrical modulation technique;
  flicker the boundary and an interior of the region of pixels to transmit an additional bit of information, wherein the additional bit of information corresponds to a direction of flickering of the region of pixels, wherein the one or more pilot symbols comprises a fixed direction of flickering, wherein the direction of flickering of the one or more pilot symbols is determined using the additional bit of information;
  wherein the one or more pilot symbols are placed in fixed position known to the information decoding module, wherein at least one of the one or more data symbols and the one or more pilot symbols are packed in a fixed pattern to implement a plurality of bits of information.

4. The computer-implemented system of claim 1, wherein to convert the one or more frames into a color space, the frame detecting submodule is further configured to:
 convert from a standard color space to the color space;
 cumulatively accumulate over the one or more frames for the energy accumulation;
 correct one or more perspective distortions using the detected frame boundary;
 detect the one or more shapes of each of the one or more data symbols, using contour detection techniques; and
 determine one or more coded bits based on the detected one or more shapes and decode the one or more coded bits using a forward-error-correcting-code technique.

5. The computer-implemented system of claim 1, wherein the symbol extracting submodule is further configured to:
 detect lines in the one or more frames using a line detection technique to extract one or more quadrilaterals corresponding to a region of interest in each of the one or more frames;
 detect one or more edges and one or more contours in the detected lines to determine the one or more shapes of the one or more data symbols;
 determine a degree of angle of tilt of the one or more contours;
 analyze iteratively one or more errors in determining the one or more data symbols; and
 output correctly determined one or more data symbols.

6. The computer-implemented system of claim 1, wherein the symbol embedding submodule is further configured to perform at least one of an up-sample and an interpolate the media content with a frame rate lower than a pre-defined frame rate to a higher frame rate of the pre-defined frame rate using at least one of an optical flow based techniques, a sample-and-hold interpolation technique, a linear interpolation technique, an optical flow interpolation technique, and a deep neural network based interpolation technique, prior to embedding the one or more data symbols.

7. The computer-implemented system of claim 1, wherein the frame displaying submodule is further configured to apply opponent colors, for one bit of the information, for each of the one or more data symbols for each of subsequent frames in the one or more frames.

8. The computer-implemented system of claim 1, wherein the frame displaying submodule is further configured to display an indicia on the screen of the display device, upon adaptively displaying at least one of the scannable barcodes and the modulated one or more pixels, and the boundary in each of the one or more frames for the pre-defined duration.

9. The computer-implemented system of claim 1, wherein each of the one or more frames is adaptively modulated by converting a standard color space to at least one of an orthogonal color space and a perceptual color space, wherein the standard color space comprise a red green blue (RGB) color space, and wherein the orthogonal color space comprises an OKlab color space, wherein the luminance channel, the lightness channel, the intensity channel are orthogonal to the color channel, in which the changing value on one channel does not affect the other channel.

10. The computer-implemented system of claim 1, wherein the one or more data symbols are modulated by modifying each pixel value within a shape of the one or more data symbols using at least one of a fixed modulation depth, a pyramidU technique and a rim technique, wherein the pyramidU technique comprises varied modulation depth based on the region of each of the one or more frames, and wherein the rim technique comprises modulating along the boundary of the one or more data symbols.

11. The computer-implemented system of claim 1, wherein the column of the one or more pilot symbols are positioned on the one or more frame in at least one of a left, a right, and a middle of each of the one or more frames based on the content of the frame, with the position fixed for the pre-defined duration of the media content.

12. A computer-implemented method for managing encoded information in a real-time screen-to-camera communication environment, the computer-implemented method comprising:

converting, by one or more hardware processors, information into a pre-defined number of characters;

generating, by the one or more hardware processors, at least one of one or more data symbols and one or more pilot symbols, and scannable barcodes corresponding to the pre-defined number of characters, wherein the one or more data symbols are generated in one or more shapes;

embedding, by the one or more hardware processors, for a pre-defined duration of media content, the generated at least one of the one or more data symbols the one or more pilot symbols, and the scannable barcodes in each of one or more frames of the media content, wherein the one or more data symbols are embedded on at least one of a grid and a fixed pattern, on each of the one or more frames, and the one or more pilot symbols are embedded as a column of at least one of discrete pilot symbols and a single continuous column of a color on each of the one or more frames;

adaptively modulating, by the one or more hardware processors, over at least one of a color channel and a luminance channel, a lightness channel, an intensity channel, one or more pixels, and a boundary in each of the one or more frames for the pre-defined duration, for the embedded one or more data symbols and the one or more pilot symbols;

adaptively displaying, by the one or more hardware processors, each pixel, on a screen associated with a display device, at least one of the scannable barcodes and the modulated one or more pixels, and the boundary in each of the one or more frames for the pre-defined duration, based on a luminance of each of one or more regions in each of one or more frames, wherein the one or more frames are adaptively displayed as one or more temporal-complementary frames (TCF);

receiving, by the one or more hardware processors, recorded content corresponding to the media content, recorded through a camera associated with a user device;

detecting, by the one or more hardware processors, the one or more frames from the recorded content, wherein the detected one or more frames are converted into a color space;

detecting, by the one or more hardware processors, at least one of the one or more data symbols, the one or more pilot symbols, and the one or more scannable barcodes in the detected the one or more frames;

extracting, by the one or more hardware processors, the one or more data symbols from the one or more frames based on at least one of the grid and the fixed pattern, wherein the one or more data symbols are extracted based on a position of the column of the one or more pilot symbols in each of the one or more frames;

detecting, by the one or more hardware processors, one or more bit values of each data symbol, by analyzing a color difference between each of the one or more frames and a shape of the one or more data symbols, wherein the color difference of the one or more data symbols and the pilot symbols is cumulatively accumulated over the one or more frames for an energy accumulation to analyze the color difference between each of the one or more frames and the one or more shapes of the one or more data symbols;

generating, by the one or more hardware processors, the information based on at least one of the detected bit values of the one or more frames and the detected one or more scannable barcodes; and outputting, by the one or more hardware processors, the generated information through at least one of displaying on a display of the user device and transmitting the information to one or more digital delivery destination platforms, wherein outputting the generated information comprises displaying at least one of one or more products, one or more recommendations, one or more services, and relevant information regarding the media content to a user of the user device for interacting with the information in a unobtrusive mode.

13. The computer-implemented method of claim 12, wherein adaptively displaying, each pixel, on the screen associated with the display device, for the modulated one or more pixels, and the boundary in each of the one or more frames, further comprises:

determining, by the one or more hardware processors, a luminance value of each of the adaptively modulated one or more pixels;

modulating, by the one or more hardware processors, the luminance value, over the luminance channel, of the one or more pixels, when the determined luminance value of each of the adaptively modulated one or more pixels is lesser than a first pre-defined threshold;

modulating, by the one or more hardware processors, the luminance value, over the color channel, of the one or more pixels, when the determined luminance value of each of the adaptively modulated one or more pixels is lesser than a second pre-defined threshold; and flickering, by the one or more hardware processors, a region of pixels to transmit the one or more data symbols, wherein the one or more data symbols encodes a plurality of bits of the information, based on flickering the region of pixels;

wherein the region of pixels encoding the one or more data symbols is an arbitrary two-dimensional shape belonging to a set of at least one of orthogonal shapes or non-orthogonal shapes.

14. The computer-implemented method of claim 13, wherein flickering the region of pixels, further comprises:

performing, by the one or more hardware processors, at least one of an intensity flickering and a color flickering the region of pixels based on determining if each region of the region of pixels comprises an intensity above a pre-defined intensity threshold;

determining, by the one or more hardware processors, the shape of the region of pixels for flickering at least one of a boundary and a rim of the region of pixels;

modifying, by the one or more hardware processors, one or more pixel values the region of pixels based on different values in one or more consecutive frames using an symmetrical modulation technique;

flickering by the one or more hardware processors, the boundary and an interior of the region of pixels to transmit an additional bit of information, wherein the additional bit of information corresponds to a direction of flickering of the region of pixels, wherein the one or more pilot symbols comprises a fixed direction of flickering, wherein the direction of flickering of the one or more pilot symbols is determined using the additional bit of information;

wherein the one or more pilot symbols are placed in fixed position known to the information decoding module, wherein at least one of the one or more data symbols and the one or more pilot symbols are packed in a fixed pattern to implement a plurality of bits of information.

15. The computer-implemented method of claim 13 further comprising:
   detecting, by the one or more hardware processors, lines in the one or more frames using a line detection technique to extract one or more quadrilaterals corresponding to a region of interest in each of the one or more frames;
   detecting, by the one or more hardware processors, one or more edges and one or more contours in the detected lines to determine the one or more shapes of the one or more data symbols;
   determining, by the one or more hardware processors, a degree of angle of tilt of the one or more contours;
   analyzing, by the one or more hardware processors, iteratively one or more errors in determining the one or more data symbols; and
   outputting, by the one or more hardware processors, correctly determined one or more data symbols.

16. The computer-implemented method of claim 13 further comprising:
   performing at least one of a up-sampling and an interpolating, by the one or more hardware processors, the media content with a frame rate lower than a pre-defined frame rate to a higher frame rate of the pre-defined frame rate using at least one of an optical flow based techniques, a sample-and-hold interpolation technique, a linear interpolation technique, an optical flow interpolation technique, and a deep neural network-based interpolation technique, prior to embedding the one or more data symbols.

17. The computer-implemented method of claim 13 further comprising:
   applying, by the one or more hardware processors, opponent colors, for one bit of the information, for each of the one or more data symbols for each of subsequent frames in the one or more frames.

18. The computer-implemented method of claim 13 further comprising:
   displaying, by the one or more hardware processors, an indicia on the screen of the display device, upon adaptively displaying at least one of the scannable barcodes and the modulated one or more pixels, and the boundary in each of the one or more frames for the pre-defined duration.

19. The computer-implemented method of claim 13, wherein each of the one or more frames is adaptively modulated by converting a standard color space to at least one of an orthogonal color space and a perceptual color space, wherein the standard color space comprise a red green blue (RGB) color space, and wherein the orthogonal color space comprises an OKlab color space, wherein the luminance channel, the lightness channel, the intensity channel are orthogonal to the color channel, in which the changing value on one channel does not affect the other channel.

20. The computer-implemented method of claim 13, wherein the one or more data symbols are modulated by modifying each pixel value within a shape of the one or more data symbols using at least one of a fixed modulation depth, a pyramidU technique, and a rim technique, wherein the pyramidU technique comprises varied modulation depth based on the region of each of the one or more frames, and wherein the rim technique comprises modulating along the boundary of the one or more data symbols.

21. The computer-implemented method of claim 13, wherein the column of the one or more pilot symbols are positioned on the one or more frame in at least one of a left, a right, and a middle of each of the one or more frames based on the content of the frame, with the position fixed for the pre-defined duration of the media content.

22. The computer-implemented method of claim 12, wherein converting the one or more frames into a color space, further comprises:
   converting by the one or more hardware processors, from a standard color space to the color space;
   cumulatively accumulating, by the one or more hardware processors, over the one or more frames for the energy accumulation;
   correcting by the one or more hardware processors, one or more perspective distortions using the detected frame boundary;
   detecting by the one or more hardware processors, the one or more shapes of each of the one or more data symbols, using contour detection techniques; and
   determining by the one or more hardware processors, one or more coded bits based on the detected one or more shapes and decode the one or more coded bits using a forward-error-correcting-code technique.

23. A non-transitory computer-readable storage medium having instructions stored therein that, when executed by one or more hardware processors, cause the one or more hardware processors to:
   convert information into a pre-defined number of characters;
   generate at least one of one or more data symbols and one or more pilot symbols, and scannable barcodes corresponding to the pre-defined number of characters, wherein the one or more data symbols are generated in one or more shapes;
   embed, for a pre-defined duration of media content, the generated at least one of the one or more data symbols the one or more pilot symbols, and the scannable barcodes in each of one or more frames of the media content, wherein the one or more data symbols are embedded as at least one of a grid, and a fixed pattern on each of the one or more frames, and the one or more pilot symbols are embedded as a column of at least one of discrete pilot symbols and a single continuous column of a color on each of the one or more frames;
   adaptively modulate, over at least one of a color channel and a luminance channel, a lightness channel, an intensity channel, one or more pixels and a boundary in each of the one or more frames for the pre-defined duration, for the embedded one or more data symbols and the one or more pilot symbols;
   adaptively display, each pixel, on a screen associated with a display device, at least one of the scannable barcodes and the modulated one or more pixels, and the boundary in each of the one or more frames for the pre-defined duration, based on a luminance of each of one or more regions in each of one or more frames, wherein the one or more frames are adaptively displayed as one or more temporal-complementary frames (TCF);
   receive recorded content corresponding to the media content, recorded through a camera associated with a user device;
   detect the one or more frames from the recorded content, wherein the detected one or more frames are converted into a color space;

detect at least one of the one or more data symbols, the one or more pilot symbols, and the one or more scannable barcodes in the detected the one or more frames;

extract the one or more data symbols from the one or more frames based on at least one of the grid, and the fixed pattern, wherein the one or more data symbols are extracted based on a position of the column of the one or more pilot symbols in each of the one or more frames;

detect one or more bit values of each data symbol, by analyzing a color difference between each of the one or more frames and a shape of the one or more data symbols, wherein the color difference of the one or more data symbols and the pilot symbols is cumulatively accumulated over the one or more frames for an energy accumulation to analyze the color difference between each of the one or more frames and the one or more shapes of the one or more data symbols;

generate the information based on at least one of the detected bit values of the one or more frames and the detected one or more scannable barcodes; and output the generated information through at least one of displaying on a display of the user device and transmitting the information to one or more digital delivery destination platforms, wherein outputting the generated information comprises displaying at least one of one or more products, one or more recommendations, one or more services, and relevant information regarding the media content to a user of the user device for interacting with the information in a unobtrusive mode.

24. The non-transitory computer-readable storage medium of claim 23, wherein for adaptively displaying, each pixel, on the screen associated with the display device, for the modulated one or more pixels, and the boundary in each of the one or more frames, the one or more hardware processors are further configured to:

determine a luminance value of each of the adaptively modulated one or more pixels;

modulate the luminance value, over the luminance channel, of the one or more pixels, when the determined luminance value of each of the adaptively modulated one or more pixels is lesser than a first pre-defined threshold;

modulate the luminance value, over the color channel, of the one or more pixels, when the determined luminance value of each of the adaptively modulated one or more pixels is greater than a second pre-defined threshold; and flicker a region of pixels to transmit the one or more data symbols, wherein the one or more data symbols encodes a plurality of bits of the information, based on flickering the region of pixels;

wherein the region of pixels encoding the one or more data symbols is an arbitrary two-dimensional shape belonging to a set of at least one of orthogonal shapes or non-orthogonal shapes.

* * * * *